United States Patent
Li et al.

(10) Patent No.: US 12,490,316 B2
(45) Date of Patent: Dec. 2, 2025

(54) METHOD AND APPARATUS FOR TRANSMITTING AND RECEIVING CONNECTION INFORMATION IN WIRELESS COMMUNICATION SYSTEM

(71) Applicant: Samsung Electronics Co., Ltd., Suwon-si (KR)

(72) Inventors: Lisi Li, Beijing (CN); Weiwei Wang, Beijing (CN); Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/412,250

(22) Filed: Jan. 12, 2024

(65) Prior Publication Data
US 2024/0155703 A1    May 9, 2024

Related U.S. Application Data

(63) Continuation of application No. 17/370,940, filed on Jul. 8, 2021, now Pat. No. 11,877,327.

(30) Foreign Application Priority Data

Jul. 10, 2020 (CN) .......................... 202010664046.9
Oct. 12, 2020 (CN) .......................... 202011086654.2

(51) Int. Cl.
*H04W 76/10* (2018.01)
*H04W 48/08* (2009.01)

(52) U.S. Cl.
CPC ........... *H04W 76/10* (2018.02); *H04W 48/08* (2013.01)

(58) Field of Classification Search
CPC .. H04L 41/0813; H04W 24/02; H04W 48/08; H04W 72/29; H04W 76/10; H04W 88/085; H04W 92/12; H04W 92/20; H04W 92/22
See application file for complete search history.

(56) References Cited

U.S. PATENT DOCUMENTS

2018/0027471 A1    1/2018  Zhang et al.
2019/0075552 A1    3/2019  Yu et al.
(Continued)

FOREIGN PATENT DOCUMENTS

EP          3001762 A1      3/2016
KR     20190143789 A       12/2019
(Continued)

OTHER PUBLICATIONS

5G; Procedures for the 5G System (5GS), 3GPP TS 23.502 version 15.9.0 (Mar. 2020) (Year: 2020).*
(Continued)

*Primary Examiner* — Ayaz R Sheikh
*Assistant Examiner* — David Zhijun Sun

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by a first entity in a wireless communication system is provided. The method includes transmitting connection assistance information to a second entity in the wireless communication system.

20 Claims, 19 Drawing Sheets

(56) References Cited

U.S. PATENT DOCUMENTS

| | | | |
|---|---|---|---|
| 2019/0098537 A1* | 3/2019 | Qiao | H04W 36/10 |
| 2019/0182716 A1 | 6/2019 | Futaki et al. | |
| 2019/0372929 A1 | 12/2019 | Yang et al. | |
| 2020/0163142 A1 | 5/2020 | Ryoo et al. | |
| 2020/0396000 A1* | 12/2020 | Ryu | H04W 48/16 |
| 2021/0243638 A1 | 8/2021 | Bae et al. | |
| 2021/0377138 A1* | 12/2021 | Sun | H04L 67/14 |

FOREIGN PATENT DOCUMENTS

| | | | |
|---|---|---|---|
| WO | 2020130911 A1 | 6/2020 | |
| WO | 2020207359 A1 | 10/2020 | |

OTHER PUBLICATIONS

Supplementary European Search Report dated Nov. 11, 2023, in connection with European Patent Application No. 21838893.2, 9 pages.

Samsung et al., "F1 interface setup and the delivery of gNB-DU capability," R3-171703, 3GPP TSG-RAN WG3 Meeting #96, Hangzhou, P.R.China, May 15-19, 2017, 4 pages.

International Search Report and Written Opinion of the International Searching Authority in connection with International Application No. PCT/KR2021/008736 issued Oct. 13, 2021, 7 pages.

ZTE et al., "Introduction of Non-Public Networks for TS38.463", R3-204458, 3GPP TSG-RAN WG3 Meeting #108-e, Jun. 1-11, 2020, 41 pages.

3GPP TS 38.473 5G; NG-RAN; F1 Application Protocol (F1AP) V15.9.0 (Apr. 2020) (Year: 2020).

3GPP TS 38.463 5G; NG-RAN; E1 Application Protocol (E1AP) V15.6.0 (Jan. 2020) (Year: 2020).

3GPP TS 38.413 5G; NG-RAN; NG Application Protocol (NGAP) V15.7.0 (Apr. 2020) (Year: 2020).

3GPP TS 38.401 5G; NG-RAN; Architecture description V15.7.0 (Jan. 2020) (Year: 2020).

3GPP TS 38.423 5G; NG-RAN; Xn Application Protocol (XnAP) V15.7.0 (Apr. 2020) (Year: 2020).

Communication pursuant to Article 94(3) EPC dated Sep. 8, 2025, in connection with European Application No. 21838893.2, 7 pages.

"3rd Generation Partnership Project; Technical Specification Group Services and System Aspects; Study on architecture aspects for using satellite access in 5G; (Release 17)", 3GPP TR 23.737, V17.1.0, Jul. 2020, 92 pages.

* cited by examiner

METHOD AND APPARATUS FOR TRANSMITTING AND RECEIVING CONNECTION INFORMATION IN WIRELESS COMMUNICATION SYSTEM

CROSS-REFERENCE TO RELATED APPLICATIONS

This application is a continuation of application Ser. No. 17/370,940 filed on Jul. 8, 2021, now U.S. Pat. No. 11,877,327 issued Jan. 16, 2024, which is based on and claims priority under 35 U.S.C. § 119 to Chinese Patent Application No. 202010664046.9 filed on Jul. 10, 2020, and Chinese Patent Application No. 202011086654.2 filed on Oct. 12, 2020 in the CNIPA, the disclosures of which are herein incorporated by reference in their entirety.

BACKGROUND

1. Field

The present disclosure relates generally to the field of wireless communication, and more specifically to a method and entity for transmitting and receiving signals in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In order to meet the increasing demand for wireless data communication services since the deployment of 4G communication systems, efforts have been made to develop improved 5G or pre-5G or 6G communication systems. Therefore, 5G or pre-5G communication systems are also called "Beyond 4G networks" or "Post-LTE systems".

Wireless communication is one of the most successful innovations in modern history. Recently, the number of subscribers of wireless communication services has exceeded 5 billion, and it continues to grow rapidly. Due to the increasing popularity of smart phones and other mobile data devices (such as tablet computers, laptops, netbooks, e-book readers and machine type devices) in consumers and enterprises, the demand for wireless data services is growing rapidly. In order to meet the rapid growth of mobile data services and support new applications and deployment, it is very important to improve the efficiency and coverage of wireless interface.

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (COMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

Compared with 5G systems, 6G systems may be implemented in higher frequency bands to achieve a higher data rate.

As estimated by ITU, global monthly mobile data traffic will reach 62 Exa Bytes (1 EB=$2^{30}$ GB) by 2020, and from 2020 to 2030, global mobile data services will grow at an annual rate of about 55%. In addition, proportions of video services and machine-to-machine communication services in mobile data services will gradually increase. By 2030, video services will be six times of non-video services, while machine-to-machine communication services will account for about 12% of mobile data services ("IMT Traffic Estimates for the Years 2020 to 2030, Report ITU-R M.2370-0").

SUMMARY

According to one aspect of the present disclosure, there is provided a method performed by a first entity in a wireless communication system, which includes transmitting connection assistance information to a second entity in the wireless communication system.

According to another aspect of the present disclosure, there is provided a method performed by a second entity in a wireless communication system, which includes receiving connection assistance information from a first entity in the wireless communication system.

According to another aspect of the present disclosure, a first entity in a wireless communication system is provided, comprising a transceiver; and a controller configured to control the transceiver to transmit connection assistance information to a second entity in the wireless communication system.

According to another aspect of the present disclosure, a second entity in a wireless communication system is provided, comprising a transceiver; and a controller configured to control the transceiver to receive connection assistance information from a first entity in the wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following discussion of FIGS. 1 to 18 and various embodiments for describing the principles of the present disclosure in the patent document are only explanatory and shall not be interpreted in any way to limit the scope of the disclosure. Those skilled in the art will understand that the principles of the present disclosure can be implemented in any properly arranged system or equipment.

Figure 1:
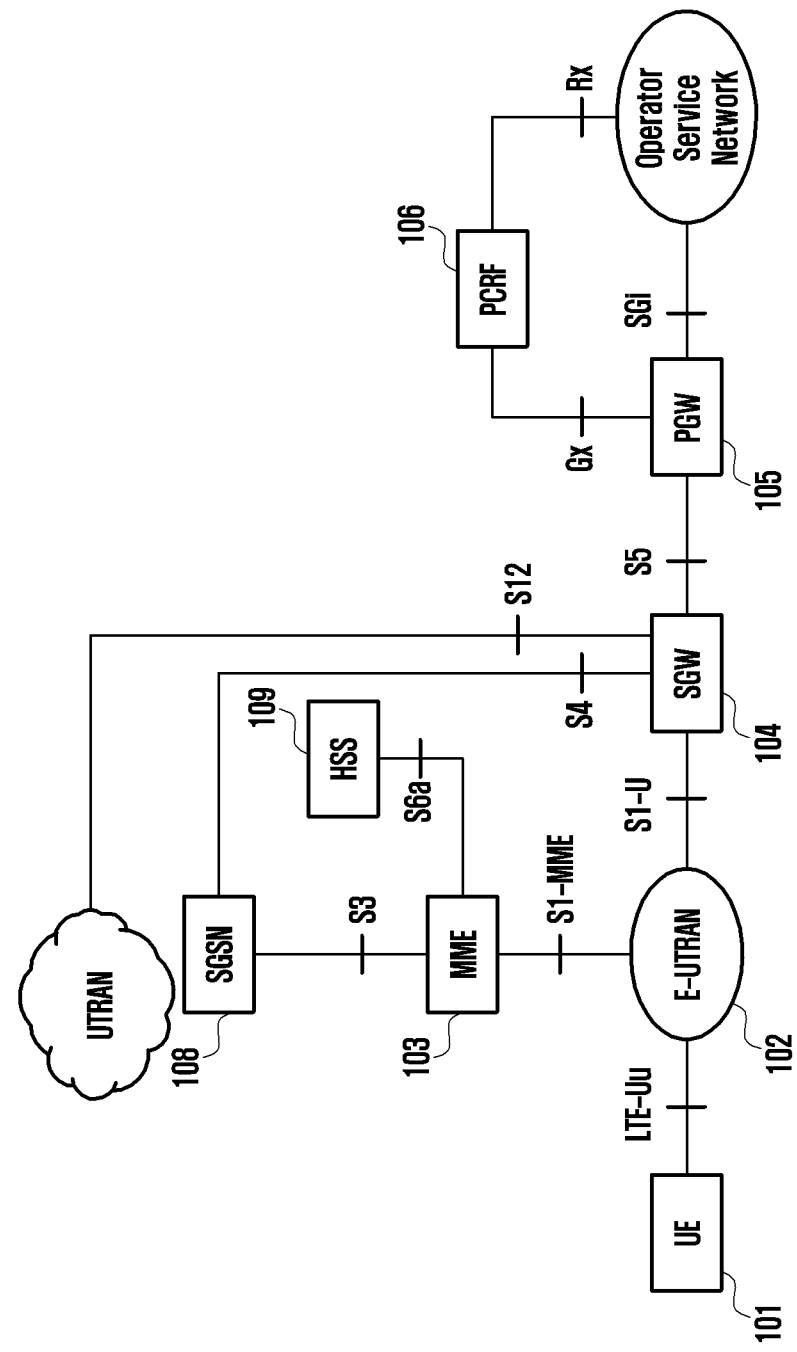
FIG. 1 illustrates an exemplary system architecture of system architecture evolution (SAE) in accordance with various embodiments of the present disclosure.

FIG. 1 is an exemplary system architecture 100 for the system architecture evolution (SAE). The user device (UE) 101 is a terminal device for receiving data. The evolution of universal terrestrial radio access network (E-UTRAN) 102 is a radio access network, which includes a macro base station (eNodeB/NodeB) that provides the UE with access to the wireless network interface. The mobility management entity (MME) 103 is responsible for managing the UE's mobility context, session context, and security information. The service gateway (SGW) 104 mainly provides the function of user plane, and MME 103 and SGW 104 may be in the same physical entity. The packet data network gateway (PGW) 105 is responsible for the functions of charging, legal monitoring, etc., and can also be in the same physical entity as SGW 104. The policy and charging rules function entity (PCRF) 106 provides quality of service (QoS) policies and charging criteria. The general packet radio service (GPRS) support node (SGSN) 108 is a network node device in the universal mobile communication system (UMTS) to provide routing for data transmission. The home subscriber server (HSS) 109 is the home subscriber subsystem of UE, which is responsible for protecting the user information comprising the current location of user equipment, the address of service node, user security information, and the packet data context of the user device.

Figure 2:
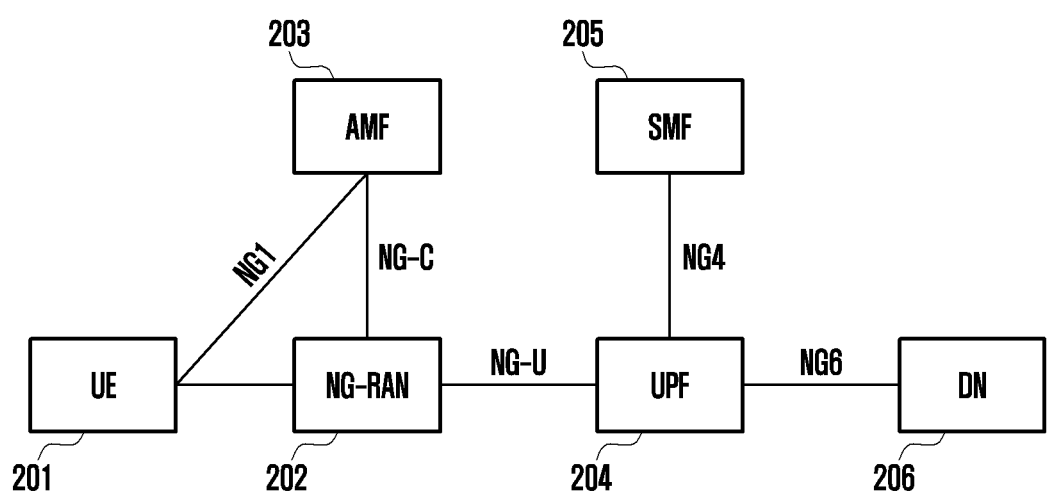
FIG. 2 illustrates an exemplary system architecture in accordance with various embodiments of the present disclosure.

FIG. 2 is an exemplary system architecture 200 according to various embodiments of the present disclosure. Other embodiments of the system architecture 200 can be used without departing from the scope of the present disclosure.

The user device (UE) 201 is a terminal device for receiving data. The next generation radio access network (NG-RAN) 202 is a radio access network, which includes base stations providing UE with access to wireless network interfaces (gNBs or eNBs connected to 5G core network 5GC, and eNBs connected to 5GC are also called ng-gNBs). The access control and mobility management function entity (AMF) 203 is responsible for managing the UE's mobility context, and security information. The user plane functional entity (UPF) 204 mainly provides the function of the user plane. Session management function entity SMF 205 is responsible for session management. The data network (DN) 206 includes services such as the operator's services, Internet access, and third-party services, etc.

With the development of wireless technology, in 5G architecture, the functional modules originally on the same base station are separated. Some of the functional modules are closer to users, while others are pooled and virtualized to be deployed centrally. That is, the base station can be divided into two parts, one of which is the central unit (CU), the other is the distribution unit (DU). The DU is closer to users, while the CU is far away from the antenna, which can support multi-antenna connection and improve network performance. One CU can connect with multiple DUs and the functions on the CU can be virtualized. The CUs and DUs are connected through the F1 interfaces, which are also called the fronthaul interface or the fronthaul connection. The functions of RRC (radio resource control), PDCP (packet data convergence protocol) are realized on the CU, and functions of RLC (radio link control), MAC (media access control) and physical layer are realized on the DU.

In recent years, the interest and participation of the mobile communication industry in the satellite communication industry is increasing. In the mobile communication environment (such as 5G, 6G), the integrated infrastructure of satellite and ground networks has market potential. NTN (non-land radio access network) refers to a network or part of a network that communicates by using airborne or air-load tools. Among them, the air-load tool can be a satellite, which can be divided into satellites in low earth orbit (LEO), middle earth orbit satellite (MEO), Geosynchronous orbit (GEO) or high elliptical orbit satellite (HEO) and the like according to the different orbital height of the satellite; airborne tools can refer to the high altitude aerial platform stations (HAPS), including UAV system (UAS), etc., such as light transport airplane (LTA), heavy transport airplane (HTA), the normal working track is 8 km to 50 km from the ground in the air.

The NTN can accelerate the promotion of the mobile communication service and improve the performance of the ground network in areas without services or with insufficient services; the NTN can provide service continuity and enhance service reliability for user equipment's or mobile platforms (such as vehicles, aircrafts, ships, high-speed trains or buses); improve service availability anywhere, especially key communication, future railway, ocean or air traffic; the system can also transmit data to the edge of the network or directly to the user equipment through efficient multicast/broadcast resources, so as to realize the scalability of mobile communication (such as 5G, 6G) networks.

The exemplary embodiments of the present disclosure are further described below in combination with the accompanying drawings.

Text and drawings are provided as examples only to help understand the present disclosure. They shall not be construed as limiting the scope of the present disclosure in any way. Although some embodiments and examples have been provided, it is clear to those skilled in the art that the embodiments and examples shown can be changed without departing from the scope of the disclosure, based on the content disclosed herein.

The connection setup method and device provided in the present disclosure can obtain connection assistance information (such as type, delay) indicating the network characteristics of another network such as the NTN after it is integrated into a mobile communication network (such as 3G, 4G, 5G or 6G), when establishing/updating a connection between entities or nodes in the network, or establishing/modifying a connection for the UE, so as to enable the access network entities or nodes to make better mobility management (such as handover decision, load balancing decision) and session management (such as user plane selection, secondary node selection), and also enable core network entities or nodes to adjust parameters (such as timers) in time and accuracy, or be used for QoS management or charging policies, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators In the following description, another network integrated into a mobile communication network (such as 3G, 4G, 5G or 6G) is described in an example of the NTN, however, the another network is not limited to this and may be any existing network or future network.

Figure 3A:
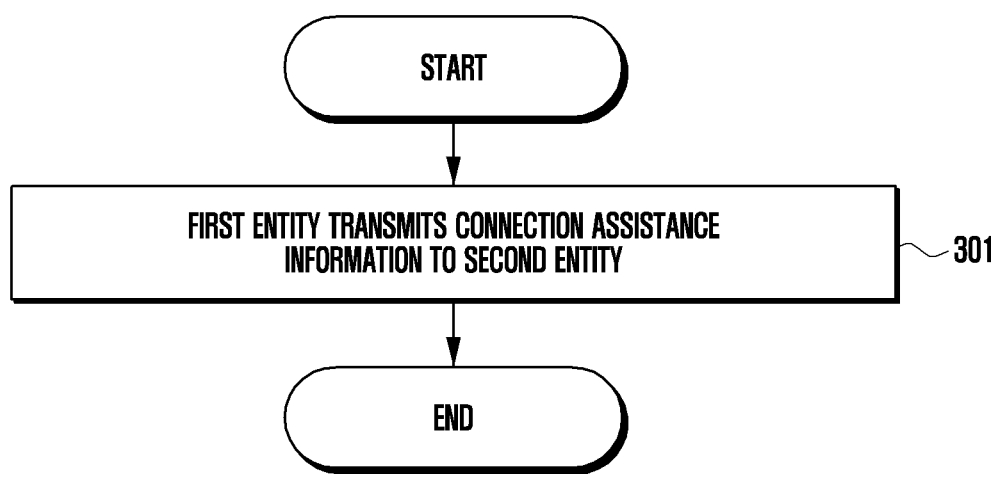
FIG. 3A illustrates a method performed by a first entity according to an embodiment of the present disclosure.

FIG. 3A illustrates a method performed by a first entity according to an embodiment of the present disclosure. A detailed description of the steps unrelated to the present disclosure is omitted in FIG. 3A. The method includes steps:

In step 301, the first entity transmits connection assistance information to the second entity.

Each of the first and second entities may be, but not limited to, base stations, DUs, CUs, CU-UPs, CU-CPs, or core network nodes. The core network nodes can be, but not limited to, AMFs, SMF s, PCFs, etc.

The first entity may transmit connection assistance information in response to a connection assistance information request received from the second entity, or the first entity may determine to transmit connection assistance information to the second entity according to configurations. The connection assistance information request may be a request for common connection assistance information or a request for UE specific connection assistance information. The request may contain at least one of the followings:

A connection assistance information request indication, which is used for indicating a request for common or UE specific connection assistance information, may include a connection assistance information request for a control plane and/or a user plane of an access network and/or a transport network, the indication may be, for example, a 1-bit indicator, a specific channel coding method, etc., but is not limited to this;

An access network connection assistance information request indication, which is used for indicating a request for common or UE specific access network connection assistance information, wherein, it may include control plane indication and/or user plane connection assistance information request indication, which may be, for example, a 1-bit indicator, a specific channel encoding method, etc., but not limited to this;

Transport network connection assistance information request indication, which is used to indicate a request for common or UE specific transport network connection assistance information, wherein, it may include control plane indication and/or user plane connection assistance information request indication, which may be, for example, a 1-bit indicator, a specific channel encoding method, etc., but not limited to this.

The connection assistance information may be information (e.g., type, delay, etc.) indicating the network characteristics of another network (such as the NTN).

The common connection assistance information can be the access network connection assistance information of all cells under the first entity and/or the transport network connection assistance information of all nodes under the first entity. The access network connection assistance information can refer to the assistance information with respect to the access network connection. The transport network connection assistance information may be connection assistance information with respect to the transport network connection. Each of the access network connection assistance information and the transport network connection assistance information may contain connection assistance information of the CP (control plane) and/or the UP (user plane). Among the common connection assistance information, there are one or more connection assistance information.

The UE specific connection assistance information may refer to the assistance information of the network connection that the UE is using or will use, and may include UE specific access network connection assistance information (for example, the assistance information of the access network connection that the UE is using or will use (including the assistance information of the CP and/or UP)) and/or UE specific transport network connection assistance information (for example, assistance information of the transport network connection that the UE is using or will use (including connection assistance information of the CP and/or UP), which can be obtained by configuration or by querying common connection assistance information based on UE related information (for example, information such as nodes, cells and/or UPs connected or to be connected by UE).

If the first entity transmits the connection assistance information in response to the connection assistance information request transmitted to the first entity by the second entity, the connection assistance information request is discussed in two cases (1A and 1B)

Case 1A: if the request is for common connection assistance information, the first entity can be the CU-UP (central control unit-user plane) or the base station, and the second entity can be the CU-CP (central control unit-control plane) or the base station. That is, the request can be a request transmitted to the CU-UP by the CU-CP or a request transmitted to the second base station by the first base station. The information can be transferred by connection setup request message between interfaces, can be a GNB-CU-CP E1 setup request transmitted by the CU-CP to the CU-UP, or an Xn setup request message transmitted by the first base station to the second base station.

Case 1B: if the request is for UE specific connection assistance information, the first entity can be the DU, the CU-UP and the base station, the second entity can be the CU, the CU-CP, the base station or the core network node, and the core network node can be the AMF. That is, the request can be a request transmitted by the CU to the DU, or a request transmitted by the CU-CP to the CU-UP, or a request transmitted by the first base station to the second base station, or a request transmitted by the AMF to the base station. The information can be transferred by a UE context setup request or session setup request message, which can be a UE context setup request message transmitted by the CU to the DU, or a bearer context setup request message transmitted by the CU-CP to the CU-UP, or a secondary node addition request message transmitted by first base station to second base station, or a PDU session resource setup request message, an initial context setup request message and a handover request message transmitted by the AMF to base station.

The connection assistance information transmitted by the first entity to the second entity in step 301 is discussed in two cases (2A and 2B).

Case 2A: if the transmitted connection assistance information is common connection assistance information, it can be access network connection assistance information of all cells under the first entity and/or transport network connection assistance information of all nodes under the first entity. The access network connection assistance information and the transport network connection assistance information may include the connection assistance information of the CP (control plane) and/or the UP (user plane). Among the common connection assistance information, there are one or more connection assistance information, and each connection assistance information may include at least one of:

Connection ID, used to indicate the cell, node or port corresponding to the connection assistance information, can be an evolved universal mobile transmission system (UMTS) terrestrial radio access network (E-UTRAN) global ID (ECGI), a cell global ID (CGI), a base station ID, a UP ID, a data radio bearer (DRB) ID or a port number and the like.

Network Type, which is the corresponding network type of the connection, can be GEO, MEO, LEO, HEO, HAPS, UAS, above-water nodes, underwater nodes, etc.

Delay Indication Information, which is the one-way theoretical delay of the connection. If the connection includes a ground gateway, the delay can include the influence of the ground gateway location.

The common connection assistance information can be established or updated by the connection between the first entity and the second entity. The second entity can be a base station, a CU, a CU-CP or core network node, and the first entity can be a base station, a DU or CU-UP, that is, the message can be transmitted by the DU to the CU, or by the CU-UP to the CU-CP, or by the base station to the core network, or by the first base station to the second base station (for example, the source base station to the target base station). The message can be an F1 setup request message, a GNB-DU configuration update message, etc. transmitted by the DU to the CU; or a GNB-CU-UP E1 setup request message, a GNB-CU-CP E1 setup response message, etc. transmitted by the CU-UP to the CU-CP; or an Xn setup request message, an Xn setup response message, an NG-RAN configuration update message, etc. transmitted by the first base station to the second base station; or an NG setup request message, a RAN configuration update message, etc. transmitted by the base station to the AMF.

Case 2B: if the connection assistance information transmitted is UE specific connection assistance information, it can refer to the assistance information of the network connection that the UE is using or will use, including the connection assistance information of the access network that the UE is using or will use (including the CP and/or UP) and/or the connection assistance information of the transport network that the UE is using or will use (including the CP and/or UP). The UE specific connection assistance information can be directly obtained by the configuration (for example, the current or connected network condition of the UE), or can be obtained by querying the common connection assistance information based on the UE related information (for example, information such as the nodes, cells and/or UPs to be connected or to be connected by the UE), which can specifically include at least one of the following items:

The connection assistance information of the CP and/or UP of the access network may include at least one of the following items:

Access Network Connection ID, used to indicate the access network connection where the UE is located or will use, and it can be the cell ID, indicating the service cell where the UE is located, including the primary service cell and/or the secondary service cell, or it can be the user plane ID of the access network, when the CP connection and UP connection of the access network are different, it is used to indicate the UP connection of the access network;

Network Type, indicating the network type of the UE access network, which can be GEO, MEO, LEO, HEO, HAPS, UAS, above-water nodes, underwater nodes, etc., or other forms;

Delay Indication, indicating the one-way theoretical delay of the UE access network, which can include a fronthaul network part. If the connection includes a ground gateway, the delay may include the influence of the location of the ground gateway.

The connection assistance information of the CP of the transport network can include at least one of the followings:

Node ID, indicating the node where the UE control plane is located, which can be the base station ID;

Network Type, indicating the type of network connected between the node where the UE control plane node is located and the core network control plane. It can be GEO, MEO, LEO, HEO, HAPS, UAS, above-water node, underwater node, etc., or other forms;

Delay Indication, indicating the one-way theoretical delay from the node, where the UE control plane is located, towards the control plane of the core network. If the connection includes the ground gateway, the delay can include the influence of the location the ground gateway.

The connection assistance information of the UP of the transport network may include at least one of the following items:

User Plane Connection ID, indicating a specific CU-UP or a specific port on the CU-UP, which can be CU-UP ID, DRB ID, port number, IP address or other forms;

Network Type, indicating the network type between the node where the UE user plane is located or the port on the node and the core network user plane, such as GEO, MEO, LEO, HEO, HAPS, UAS, above-water nodes, underwater nodes, etc., or other forms;

Delay Indication, indicating the one-way theoretical delay from the node, where the UE user plane is located, or the port on the node being towards the core network user plane. If the connection includes a ground gateway, the delay may include the influence of the ground gateway position.

The UE specific connection assistance information can be transmitted by a message of UE connection setup or modification transmitted by the first entity to the second entity. The first entity can be a DU, a CU, a CU-UP, a CU-CP, a base station or a core network node, and the second entity can be a CU, a CU-UP or a core network node, and the core network node can be an AMF, an SMF or PCF (policy control function), etc. That is, the message can be transmitted to the CU by the DU, or transmitted to the CU-CP by the CU-UP, or transmitted to the second base station by the first base station (for example, transmitted to the target base station by the source base station), or transmitted to the core network by the CU, CU-CP or the base station, or transmitted to the core network by the core network (such as the AMF to the SMF). The message can be a UL RRC message transfer message or a UE context setup response message, etc. transmitted by the DU to the CU; or a bearer context setup response message, etc. transmitted by the CU-UP to the CU-UP; or the secondary node addition request acknowledge message or a secondary node modification required, etc. transmitted by the first base station to the second base station; or an initial UE message, uplink NAS transport message, initial context setup response message, PDU session resource setup response message, PDU session resource modify indication message, path switch request message, handover request acknowledge message or connection modification indication message, etc. transmitted to the core network by the CU, CU-UP or the base station; or a create session management context request message, update session management context request message, etc. transmitted by the AMF to the SMF.

Figure 3B:
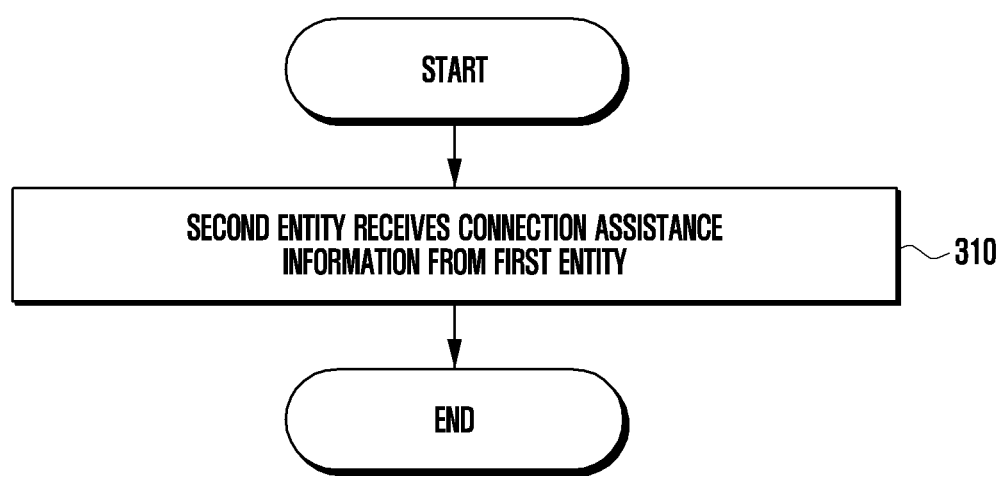
FIG. 3B illustrates a method performed by a second entity according to an embodiment of the present disclosure.

FIG. 3B illustrates a method performed by a second entity according to an embodiment of the present disclosure. A detailed description of the steps unrelated to the present disclosure is omitted in FIG. 3B. The method includes steps:

In step 310, the second entity receives connection assistance information from the first entity. The connection assistance information may be a common connection assistance information or UE specific connection assistance information. The second entity can directly or indirectly obtain the transmission delay of the connection, which is divided into the following situations (3A, 3B, 3C) to discuss:

Case 3A: if the connection assistance information received by the second entity only contains connection ID information, the second entity can query the preconfigured or acquired corresponding list of connection ID and network type and/or delay indication according to the connection ID, so as to obtain the transmission delay information of the connection.

Case 3B: if the connection assistance information received by the second entity only contains a connection ID and/or network type, the second entity can infer the transmission delay of the connection according to the network type.

Case 3C: if the connection assistance information received by the second entity contains a delay indication, the second entity directly obtains the transmission delay of the connection.

After the transmission delay of the connection is obtained, the second entity may optionally do the following processing:

If the second entity receives common connection assistance information, the second entity can perform processing according to several cases (4A, 4B):

Case 4A: if the second entity obtains common connection assistance information (e.g. transmitted to the CU by the DU, or transmitted to the DU by the CU-UP, or transmitted to the AMF by a base station) of a cell or node connected under the second entity, the second entity stores the information, when the UE establishes or modifies context or session, it can select appropriate nodes according to common assistance information (for example, the CU-CP can select appropriate CU-UP(s) for the UE according to the connection assistance information of each CU-UP), or the UE specific connection assistance information can also be obtained through querying according to known information (such as the cell and node where the UE is located), and then the information can be forwarded to other entities through messages.

Case 4B: if the second entity obtains the common connection assistance information of a cell or node under the adjacent entity of the second entity (such as transmitted to the second base station by the first base station), the second entity can refer to the information at handover decision, load balancing decision or secondary node selection for the UE to select a more appropriate cell or node for the UE; or, after completing the handover decision, load balancing decision or secondary node selection, it can also query the common connection assistance information through the information such as the cell ID or node ID to obtain the connection assistance information to be used by the UE (i.e., UE specific connection assistance information) and transmit the information to the core network node(s) in time, so that the core network node(s) can adjust the parameters.

If the second entity receives UE specific connection assistance information, the second entity can perform processing according to the following cases (5A, 5B, 5C):

Case 5A: if the second entity is a CU, a CU-CP or a base station, the UE specific connection assistance information can be saved and forwarded subsequently to the core network node or other base station for decision or query when establishing or updating the UE connection.

Case 5B: if the second entity is an AMF, the AMF can adjust the NAS timer according to the received connection assistance information and forward the same to other core network nodes, such as an SMF or PCF, when necessary.

Case 5C: if the second entity is an SMF, the SMF can adjust the NAS timer, select the UPF, select QoS parameters, etc. according to the received connection assistance information, and forward the same to other core network nodes, such as the PCF, when necessary.

The above method described in connection with FIG. 3A and FIG. 3B can enable each entity or node in the network to obtain connection assistance information indicating the network characteristics of another network such as the NTN when establishing connection or establishing connection for the UE, so as to make more reasonable network configuration and resource selection, and also to timely adjust parameters, improve functions of QoS management or policy charging etc., thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

Figure 4:
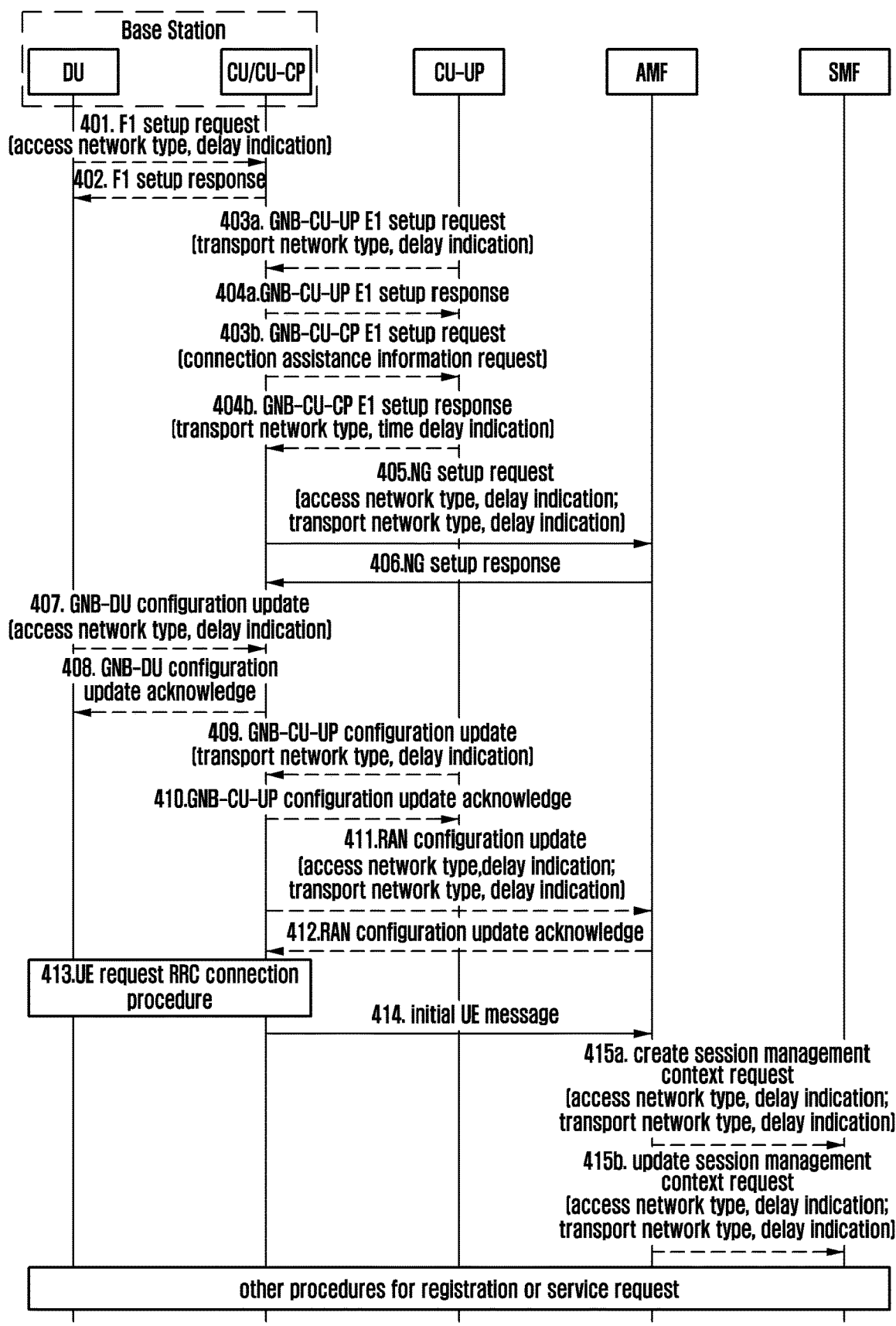
FIG. 4 illustrates a connection setup method according to an embodiment of the present disclosure.

FIG. 4 illustrates a connection setup method according to an embodiment of the present disclosure. A detailed description of steps unrelated to the present disclosure is omitted in the description of FIG. 4. The method includes steps:

In step 401, if the base station is in the architecture of separation of the CU and DU, the DU transmits the F1 interface setup message to the CU or CU-CP, and the base station can include the DU, the CU or CU-CP and the CU-UP. The message may contain one or more common connection assistance information, which refers to the access network connection assistance information of each cell under the DU, and the information can include the CP and/or UP access network connection assistance information, which can be divided into the following cases (6A, 6B), Case 6A: if the CP and UP connections of the access network are the same, the following contents can be included:
  Service Cell List, indicating all the service cells under the DU, and may include at least one of the following items:
  Cell ID, indicating the specific cell under the DU, which can be ECGI or CGI, etc.;
  Access Network Type, indicating the access network type of the cell, which can be GEO, MEO or LEO, or other forms;
  Delay Indication, indicating the theoretical one-way delay of the cell access network. The delay includes the delay between the UE and the DU, and can also include the delay between the DU and the CU. If the connection includes a ground gateway, the influence of the location of the ground gateway on the delay can be considered.

case 6B: if the CP and UP connections of the access network are different, in addition to the contents described in case 6A, the following contents can also be included:
  Service Cell List, indicating all the service cells under the DU;
  Cell ID, indicating the specific cell under the DU, which can be ECGI or CGI, etc.;
  Access Network UP Connection List, which can include at least one of the following items:

Access Network UP ID, used to indicate the connection of the user plane of the access network where the UE is located, which can be the access network UP ID, frequency point number, etc.

Access Network Type, indicating the access network type of the cell, which can be GEO, MEO or LEO or other forms;

Delay Indication, indicating the theoretical one-way delay of the cell access network. The delay includes the delay between the UE and the DU, and can also include the delay between the DU and the CU. If the connection includes a ground gateway, the influence of the location of the ground gateway on the delay can be considered.

In step 402, the CU or the CU-CP receives the F1 setup request message from the DU, saves the connection assistance information carried in the message, and transmits the F1 setup response message to the DU.

Step 403a, if the base station is in the architecture of separation of the CU-CP and the CU-UP, the CU-UP transmits the GNB-CU-UP E1 setup request message to the CU-CP, the message can contain UP (user plane) common connection assistance information, which refers to the UP transport network connection assistance information from the ports face on the CU-UP or the CU-UP towards the core network, and can contain one or more connection assistance information, each common connection assistance information includes at least one of the following:

UP Connection ID, indicating a specific CU-UP or a specific port on CU-UP, which can be CU-CP ID, port number, IP address or other forms;

Transport network type, indicating the network type of the transmission port towards the core network, which can be GEO, MEO or LEO, or other forms;

Delay Indication, indicating the theoretical one-way delay of the transport network between the transmission port and the core network. In the NTN transparent scenario, the influence of the location of the ground station on the delay can be considered.

In step 404a, the CU-CP receives the GNB-CU-UP E1 setup request message from the CU-UP, saves the connection assistance information carried in the message, and transmits the GNB-CU-UP E1 setup response message to the CU-UP.

In step 403b, if under the architecture of separation of the CU-CP and the CU-UP, the CU-CP transmits the GNB-CU-CP E1 setup request message to the CU-UP, the message can carry a connection assistance information request, and the request is to indicate the CU-UP to provide all the UP common transport network connection assistance information under the CU-UP. The request may include at least one of the following:

Connection Assistance Information Request Indication, used to indicate the request for common connection assistance information, may include the connection assistance information request of the user plane of the transport network;

Transport network Connection Assistance Information Request Indication, used to indicate a request for common transport network connection assistance information, wherein, it can contain user plane connection assistance information request indication.

The CU-UP receives the message.

In step 404b, the CU-UP transmits the GNB-CU-CP E1 setup response message to the CU-CP, the message may contain the UP common transport network connection assistance information, and the transmission of the information may be triggered by the connection assistance information request in step 403b, or by the CU-UP's own configuration, and the specific content of the information is described as step 403a.

There is no sequential order between steps 401 to 402 and steps 403a to 404b. Steps 403a and 404a, and steps 403B and 404b can be implemented in either way.

After the CU-CP obtains the common connection assistance information of multiple CU-UPs, it can select the appropriate CU-UP for the UE when creating the PDU session according to the delay indication in the assistance information.

In step 405, the base station transmits an NG setup request message to the AMF, the message may contain common connection assistance information, and the information refers to the access network assistance information of each cell, the CP and/or UP transport network connection assistance information of each node under the base station, and may include at least one of the following items:

Access Network Information, the specific content is described as step 401, and the access network information includes the fronthaul network information under the separation architecture;

CP Transport network Connection Assistance Information, may include at least one of the following items:

Node ID, indicating a specific CU, CU-CP or base station, may be a base station ID, etc.;

Transport network Type, indicating the network type of the node facing the control surface of the core network, which can be GEO, MEO or LEO or other forms;

Delay Indication, indicating the theoretical one-way delay of the transport network between the node and the core network. In the NTN scenario, the influence of the location of the ground station on the delay can be considered;

UP Transport network Connection Assistance Information, and the specific content is described as step 403a.

In step 406, the AMF receives the NG setup request message from the base station, saves the common connection assistance information carried in the message, and transmits the NG setup response message to the base station.

In step 407, if the access network connected by the DU changes, such as the NTN network is no longer used or the satellite track or ground gateway changes, the DU transmits the GNB-DU configuration update message to the CU or CU-CP, which can carry updated access network assistance information, and the information content is described in In step 401.

In step 408, the CU or CU-CP receives the GNB-DU configuration update message from the DU, saves the updated common connection assistance information carried in the message, and transmits the GNB-DU configuration update acknowledge message to the DU.

In step 409, if the transport network connected by the CU-UP changes, such as the NTN network is no longer used or the satellite track or ground gateway changes, the CU-UP transmits a GNB-CU-UP configuration update message to the CU-CP, which can carry updated common connection assistance information, and the contents of the package are described in step 403a.

In step 410, the CU-CP receives the GNB-CU-UP configuration update message from the CU-UP, saves the common connection assistance information carried in the message, and transmits a GNB-CU-UP configuration update acknowledge message to the CU-CP.

In step 411, if the access network or transport network connected by the base station changes or steps 407 to 410 contain updated common connection assistance information, such as the satellite track or ground gateway in the network changes, the base station transmits a RAN configuration update message to the AMF, which can carry the updated common connection assistance information, the specific content of the information is described as the common connection assistance information in step 405.

In step 412, the AMF receives the RAN configuration update message from the base station, saves the common connection assistance information carried in the message, and transmits a RAN configuration update acknowledge message to the base station.

In step 413, the UE initiates an RRC setup procedure and carries a NAS message in the RRC setup complete message, which can be used for initial registration or service request.

In step 414, the base station transmits an initial UE message to the AMF, wherein the NAS message in step 413 is carried.

After receiving the message, the AMF can query and obtain UE specific connection assistance information (including CP and/or UP) according to the information of the base station, cell or UP and the like carried in the message, and directly or indirectly obtain the connection delay that the UE is using or will use according to the contents of the UE specific connection assistance information, so as to adjust relevant parameters, such as the NAS timer, etc.

In step 415*a*, if the NAS message requesting PDU connection establishment is carried in step 413, the AMF transmits a create session management context request message to the SMF, which can carry the UE specific connection assistance information (including CP and/or UP) obtained in step 414, and the information may include connection assistance information for the access network and/or the transport network.

In step 415*b*, if the NAS message of the service request is carried in step 413, the AMF transmits an update session management context request message to the SMF, which can carry the UE specific connection assistance information (including CP and/or UP) obtained in step 414, and the information may include connection assistance information for the access network and/or the transport network.

The UE specific connection assistance information received by the SMF can directly or indirectly obtain the connection delay that the UE is using or will use according to the contents of the information, so as to adjust parameters, such as timer, QoS parameters, etc., or can also conduct QoS management according to the information to better meet the service quality requirements of users.

A connection setup method is described above in combination with FIG. 4. The signalling procedure between entities such as the AMF, the SMF, and the DU, the CU/CU-CP, the CU-UP of the base station in the CU-DU separation architecture and the like is shown in FIG. 4. Additionally or alternatively, each of the entities shown in FIG. 4 can be replaced with another entity or a combination of multiple entities capable of achieving the same or similar functions in an existing network or future network, and any signalling (or message) transmitted between the entities shown in FIG. 4 may be replaced with another signalling (or message) capable of achieving the same or similar functions in an existing network or future network.

Through the method described in connection with FIG. 4, it is possible for nodes or entities in the network to obtain connection assistance information indicating the characteristics of another network (for example, the NTN network) when establishing or updating the connection between each other, or restoring the connection between the UE and the core network, so as to make more reasonable network configuration and resource selection, and also may adjust network parameters according to the connection assistance information, which can be used for functions such as QoS management or policy charging and the like, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

Figure 5:
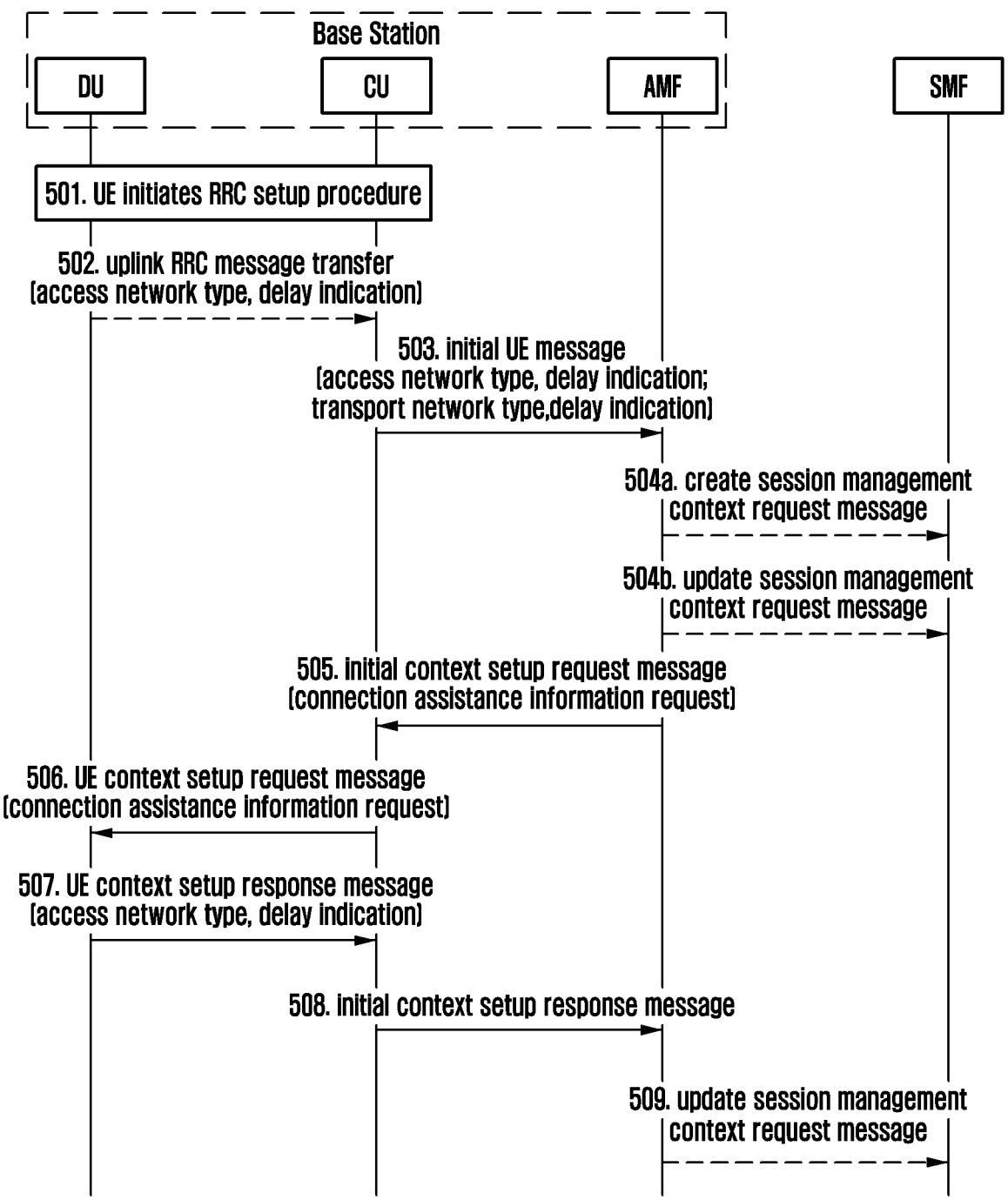
FIG. 5 illustrates another connection setup method according to an embodiment of the present disclosure.

FIG. 5 illustrates another connection setup method according to an embodiment of the present disclosure. Detailed description of steps unrelated to the present disclosure is omitted in the description of FIG. 5. The method includes the following steps:

In step 501, the UE initiates the RRC setup procedure to the base station, which carries an RRC setup reason and a NAS message. The base station may include the DU and CU.

In step 502, if the DU and CU are under separation architecture, the DU transmits an uplink RRC message transfer message to the CU after receiving an RRC setup complete message of the UE, the message can carry UE specific connection assistance information, including CP and/or UP access network connection assistance information, and the information can include an access network type and/or a delay indication, the specific content description is the same as that of the access network connection assistance information of case 2 Step 301. The CU receives the message.

In step 503, the base station (or CU of the base station) transmits an initial UE message to the AMF, in which the UE specific connection assistance information can be carried, and the information includes the UE connection assistance information of the CP and/or UP access network and/or transport network, which may include an access network type and/or a delay indication, and/or a transport network type and/or a delay indication. The specific content is described as the UE specific connection assistance information in step 302, which may be obtained by configurations or by step 502.

In step 504*a*, if a NAS message requesting PDU connection establishment is carried in step 503, the AMF transmits a create session management context request message to the SMF, which may include the UE specific connection assistance information obtained in 503.

In step 504*b*, if the NAS message of the service request is carried in step 503, the AMF transmits an update session management context request message to the SMF, which may include the UE specific connection assistance information obtained in 503.

In step 505, the AMF transmits an initial context setup request message to the base station. If the core network node does not obtain the UE specific connection assistance information in the above steps, or the information is incomplete, the message can carry the connection assistance information request, which indicates the connection assistance information to be used by the UE to feed back to the base station, and the request can contain an access network connection assistance information request and/or a transport network connection assistance information request, or may contain a CP and/or UP connection assistance information request. The request may include at least one of the following:

Connection assistance information request indication, used for indicating a request for the UE specific connection assistance information, which may include a connection assistance information request for a control plane and/or a user plane of the access network and/or the transport network;

Access network connection assistance information request indication, used for indicating a request for the UE specific access network connection assistance information, which may include a control plane indication and/or a user plane connection assistance information request indication;

Transport network connection assistance information request indication, used to indicate the request for the UE specific transport network connection assistance information, which may include a control plane indication and/or a user plane connection assistance information request indication.

The base station receives the message.

In step 506, if under the architecture of separation of the CU and DU, the CU transmits a UE context setup request message to the DU. If the CU does not obtain the UE specific connection assistance information in the above steps, or the information is incomplete, the message may carry the connection assistance information request, which indicates the connection assistance information to be used by the DU to feed back to the UE, and may include the CP and/or UP connection assistance information request. The DU receives the message.

In step 507, the DU transmits a UE context setup response message to the CU, in which the UE specific connection assistance information can be carried, and the transmission of the message can be triggered by the connection assistance information request in step 506 or by the DU itself. The message may include an access network type and/or a delay indication. The specific content description is consistent with the access network connection assistance information of case 2 in step 301. The CU receives the message.

In step 508, the base station (or CU of the base station) feeds back an initial context setup response message to the AMF, and the message can carry the UE specific connection assistance information, and the transmission of the message can be triggered by the connection assistance information request in step 503, or by the base station itself. The message includes a UE specific access network type and/or a delay indication, and/or a transport network type and/or a delay indication, as described in the UE specific connection assistance information in step 302.

In step 509, if the AMF obtains the UE specific connection assistance information only through step 508, the AMF transmits the information to the SMF through the update session management context request message.

After receiving the UE specific connection assistance information, the AMF saves the information, and according to the content of the information, directly or indirectly obtains the delay of the CP and/or UP connection that the UE is using or will use, so as to adjust the parameters, and forwards the information to other nodes, such as the SMF or PCF or the like, when necessary.

After receiving the UE specific connection assistance information, the SMF can directly or indirectly obtain the CP and/or CP connection delay that the UE is using or will use according to the content of the information, so as to adjust the parameters, such as timer, QoS parameters, etc., and can also perform QoS management according to the information, so as to better meet the user's service quality requirements.

Another connection setup method is described above in combination with FIG. 5. The signalling procedure between entities such as the AMF, the SMF, and the DU, the CU of the base station in the CU-DU separation architecture and the like is shown in FIG. 5. Additionally or alternatively, each of the entities shown in FIG. 5 can be replaced with another entity or a combination of multiple entities capable of achieving the same or similar functions in an existing network or future network, and any signalling (or message) transmitted between the entities shown in FIG. 5 may be replaced with another signalling (or message) capable of achieving the same or similar functions in an existing network or future network.

Through the method described in connection with FIG. 5, the node or entity in the network is able to obtain the connection assistance information indicating the network characteristics of another network such as the NTN when establishing the connection between the UE and the core network, so that the network parameters can be adjusted according to the connection assistance information, which can be used for functions such as QoS management or policy charging and the like, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

Figure 6:
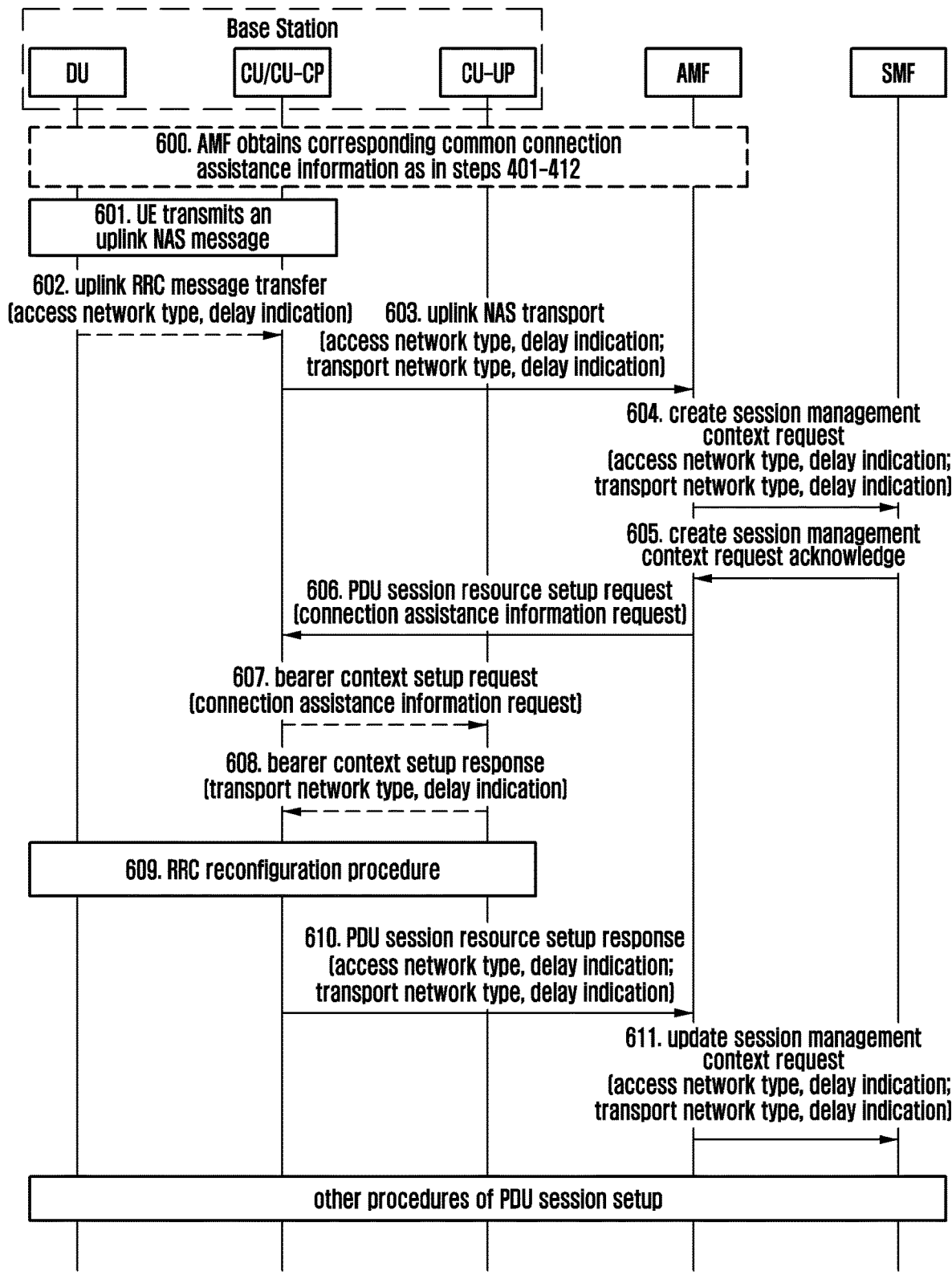
FIG. 6 illustrates still another connection setup method according to an embodiment of the present disclosure.

FIG. 6 illustrates yet another connection setup method according to an embodiment of the present disclosure. Detailed description of steps unrelated to the present disclosure is omitted in the description of FIG. 6. The method includes the following steps:

In step 600, the AMF can obtain the corresponding common connection assistance information under the base station according to steps 401 to 412. The AMF can query the common connection assistance information according to the information of the node, cell and/or UP and the like that is connected or will be connected by the UE to obtain the UE specific connection assistance information. The base station may include the DU, the CU or CU-CP, the CU-CP.

In step 601, the UE transmits an uplink NAS message including a PDU setup request.

In step 602, if in DU and CU separation architecture, after receiving the uplink NAS message, the DU transmits an uplink RRC message transfer message to the CU or CU-CP, including the uplink NAS message requesting PDU setup. The message can also contain UE specific access network connection assistance information, and the information can include an access network type and/or a delay indication, as described step 502.

In step 603, after receiving the uplink NAS message, the base station (or CU/CU-CP of the base station) transmits the uplink NAS transport message to the AMF, including the uplink NAS message requesting PDU setup. If not under the separation architecture without CU-UP, the message can also contain the UE specific connection assistance information, which can be the connection assistance information used by UE or the connection assistance information of the access network and/or the transport network used by UE, and the information can include CP and/or UP. The information may include an access network type and/or a delay indication, and/or a transport network type and/or a delay indication, as described in the UE specific connection assistance information in step 302, which may be obtained by configurations, also may be obtained based on the common connection assistance information and the UE access information in step 600, or may be obtained by step 602. AMF receives the message.

In step 604, the AMF transmits a create session management context request message to the SMF, and the message may carry UE specific connection assistance information, which may be obtained from step 600 or step 603. The SMF receives the message.

In step 605, the SMF transmits a create session management context request acknowledge message to the AMF. The AMF receives the message.

In step 606, the AMF transmits a PDU session resource setup request message to the base station. If the AMF has no UE specific connection assistance information or the information is incomplete at the moment, the message may carry a connection assistance information request to indicate the base station to feed back the UE specific connection assistance information of the UE under the base station. The request may include at least one of the following:

Connection assistance information request indication, used for indicating a request for the UE specific connection assistance information, which may include a connection assistance information request for the control plane and/or the user plane of the access network and/or the transport network;

Access network connection assistance information request indication, used for indicating a request for the UE specific access network connection assistance information, which may include a control plane indication and/or a user plane connection assistance information request indication;

Transport network connection assistance information request indication, used for indicating a request for the UE specific transport network connection assistance information, which may include a control plane indication and/or a user plane connection assistance information request indication.

The base station receives the message.

In step 607, if the CU-CP selects the CU-UP under the architecture of separation of CU-CP and CU-UP, the appropriate CU-CP can be selected for the UE according to the CU-CP common connection assistance information obtained in step 600.

After the selection is completed, the CU-CP transmits a bearer context setup request message to the CU-UP. The message can carry the connection assistance information request message, which indicates that after the UE context is established, the UE specific connection assistance information to be used by UE needs to be fed back. The request may include at least one of the following:

Connection assistance information request indication, used to indicate a request for the UE specific connection assistance information, which may include a connection assistance information request of the user plane of the transport network;

Transport network connection assistance information request indication, used to indicate a request for the UE specific transport network connection assistance information, in which a user plane connection assistance information request indication may be included.

The CU-UP receives the message.

In step 608, the CU-UP transmits a bearer context setup response message to the CU-CP, in which the UE specific connection assistance information can be carried, and the transmission of the information can be triggered by the connection assistance information request in step 607 or by the configuration of the CU-UP itself. The information refers to the connection assistance information from the port on the CU-UP or CU-UP allocated for the UE to the user plane of the core network, and the information can include a UE UP transport network type and/or a delay indication, the specific content is described as the UP transport network connection assistance information in case 2 in step 302. The CU-CP receives the message.

In step 609, the base station initiates the RRC reconfiguration procedure.

In step 610, the base station (or CU/CU-CP of the base station) transmits a PDU session resource setup response message to the AMF, and the message can carry the latest UE specific connection assistance information, and the transmission of the information can be triggered by responding to the connection assistance information request in step 606 or triggered by the configuration of the base station itself. The content of the information may include an access network type and/or a delay indication, and/or a transport network type and/or a delay indication, the specific content is described as the UE specific connection assistance information in step 302. The AMF receives the message.

In step 611, the AMF transmits an update session management context request to the SMF, which can carry the UE specific connection assistance information, the content of which may include an access network type and/or a delay indication, and/or a transport network type and/or a delay indication, and the information can be obtained by 600, 603 or 610.

The AMF may query and obtain the UE specific connection assistance information according to the common connection assistance information obtained in step 600 and the information of the node, cell and/or UP and the like where the UE is located or to be used by UE, or obtain the UE specific connection assistance information through step 603 or step 610. After obtaining the latest UE specific connection assistance information, the AMF saves the information, and directly or indirectly obtains the delay of CP and/or UP connection that the UE is using or will use according to the content of the information, so as to adjust parameters and transfer the information to other nodes, such as the SMF or PCF, when necessary.

After receiving the UE specific connection assistance information, the SMF can directly or indirectly obtain the CP and/or CP connection delay that the UE is using or will use according to the content of the information, so as to adjust the parameters, such as timer, QoS parameters, etc., and can also perform QoS management according to the information, so as to better meet the user's service quality requirements.

Another method of connection setup is described above in combination with FIG. 6. The signalling procedure between entities such as the AMF, the SMF, and the DU, the CU/CU-CP, the CU-UP of the base station in the CU-DU separation architecture and the like is shown in FIG. 6. Additionally or alternatively, each of the entities shown in FIG. 6 can be replaced with another entity or a combination of multiple entities capable of achieving the same or similar functions in an existing network or future network, and any signalling (or message) transmitted between the entities shown in FIG. 6 may be replaced with another signalling (or message) capable of achieving the same or similar functions in an existing network or future network.

Through the method described in connection with FIG. 6, the node or entity in the network can obtain the connection assistance information indicating the network characteristics of another network such as the NTN when establishing the connection between the UE and the user plane of the core network, so that the network parameters can be adjusted according to the connection assistance information, which can be used for functions such as QoS management or policy charging and the like, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

Figure 7:
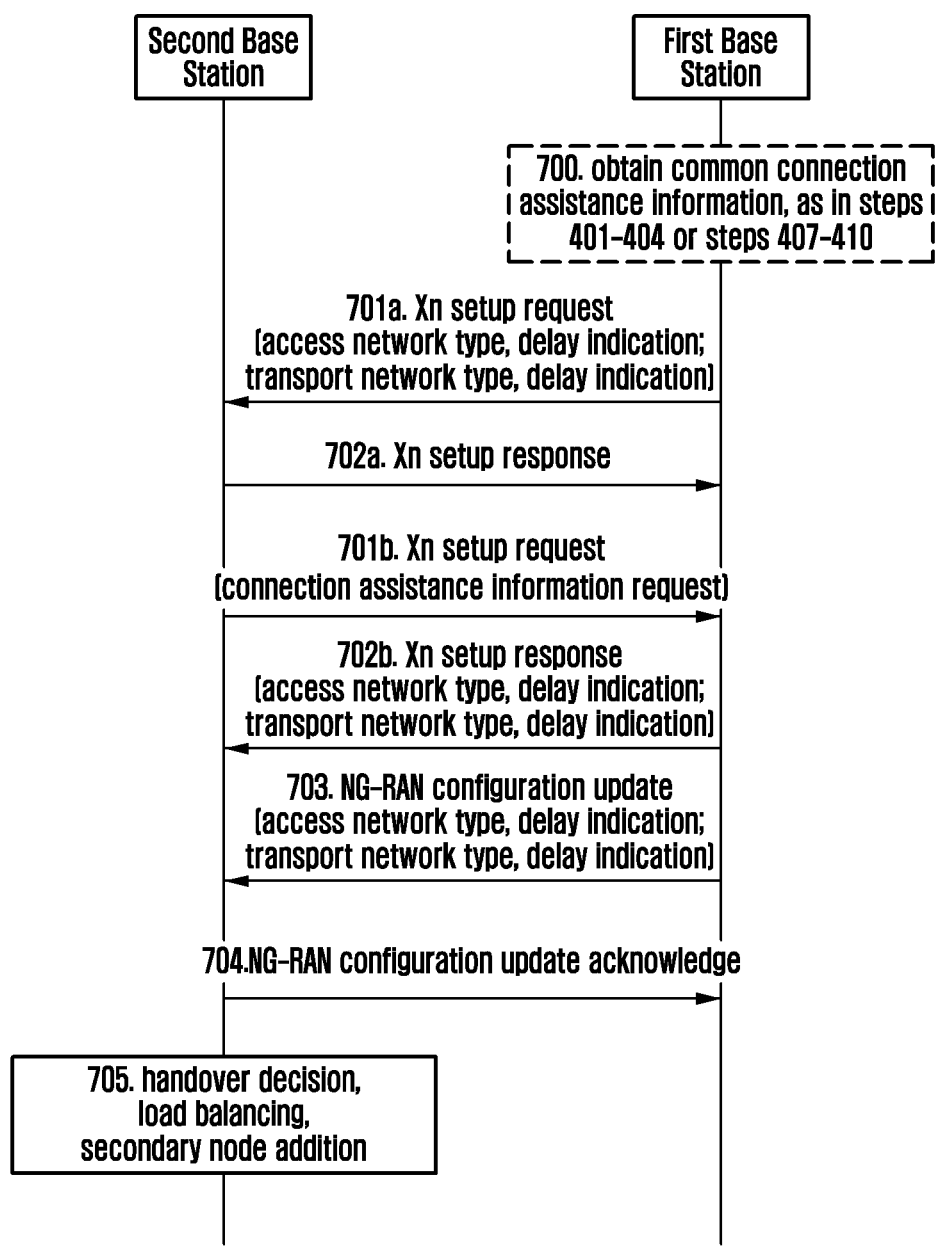
FIG. 7 illustrates still another connection setup method according to an embodiment of the present disclosure.

FIG. 7 illustrates another connection setup method according to an embodiment of the present disclosure. A detailed description of steps unrelated to the present disclosure is omitted in the description of FIG. 7. The method includes the following steps:

Step 700, if the first base station is in a separation architecture, the first base station may obtain a common connection assistance information of the cell or node under the first base station according to steps 401 to 404 or steps 407 to 410.

In step 701a, if the first base station initiates connection setup first, the first base station transmits an Xn setup request message to the second base station, wherein the message can carry the common connection assistance information of the cell or node under the first base station, and the information can be obtained by the configuration or step 700, and the information may include one or more access network types and/or delay indications, and/or transport network types and/or delay indications, the specific content is described as the common connection assistance information in step 405. The second base station receives the message.

In step 702a, in response to step 702a, the second base station transmits an Xn setup response message to the first base station. The first base station receives the message.

In step 701b, if the second base station initiates the connection setup first, the second base station transmits an Xn setup request message to the first base station, in which the connection assistance information request can be carried, and the request is to indicate the first base station to response the common connection assistance information under the first base station. The request may include at least one of the following:

Connection assistance information request indication, used for indicating a request for the common connection assistance information, which may include a connection assistance information request for the control plane and/or the user plane of the access network and/or the transport network;

Access network connection assistance information request indication, used to indicate a request for the common access network connection assistance information, which may include a control plane indication and/or a user plane connection assistance information request indication;

Transport network connection assistance information request indication, used to indicate a request for the common transport network connection assistance information, which may include a control plane indication and/or a user plane connection assistance information request indication.

The first base station receives the message.

In step 702b, in response to step 701b, the first base station transmits an Xn setup response message to the second base station, wherein the message can carry the common connection assistance information under the first base station, the information may include one or more access network types and/or delay indications, and/or transport network types and/or delay indications, the specific content is described as the common connection assistance information in step 405. The second base station receives the message.

In step 703, if the common connection assistance information under the first base station changes, the first base station transmits a NG-RAN configuration update message to the second base station, and the message can carry the updated common connection assistance information, which can be obtained by the configuration or step 700, and the information can include one or more access network types and/or delay indications, and/or transport network types and/or delay indications, the specific content is described as the common connection assistance information in step 405. The second base station receives the message.

In step 704, the second base station transmits a NG-RAN configuration update acknowledge message to the first base station. The first base station receives the message.

In step 705, after receiving the common connection assistance information of the first base station, if the second base station is to make a handover decision on the cell under the first base station, or consider the load balancing strategy, or add a secondary node or cell, the second base station can perform the operations of handover decision, unloading users or adding a secondary node or the like, according to the common connection assistance information of the cell and/or node under the first base station obtained in step 701.

Another method of connection setup is described above in combination with FIG. 7. A signalling procedure between entities such as the first base station, the second base station and the like is shown in FIG. 7. Additionally or alternatively, each of the entities shown in FIG. 7 can be replaced with another entity or a combination of multiple entities capable of achieving the same or similar functions in an existing network or future network, and any signalling (or message) transmitted between the entities shown in FIG. 7 may be replaced with another signalling (or message) capable of achieving the same or similar functions in an existing network or future network.

Through the method described in connection with FIG. 7, it is possible to enable the base station to be capable to obtain the connection assistance information under the adjacent base station in advance, and make the base station make better mobility management (such as handover decision, unload judgement) and session management (such as user plane selection and secondary node selection) strategy, reasonably utilize network resources, guarantee user experience, and solve the problem caused by the delay after another network such as the NTN integrated into the mobile communication system, which not only expands business and enlarges service utilizing another network such as the NTN, but also ensures the UE service experience, and finally increases the profits for operators.

Figure 8:
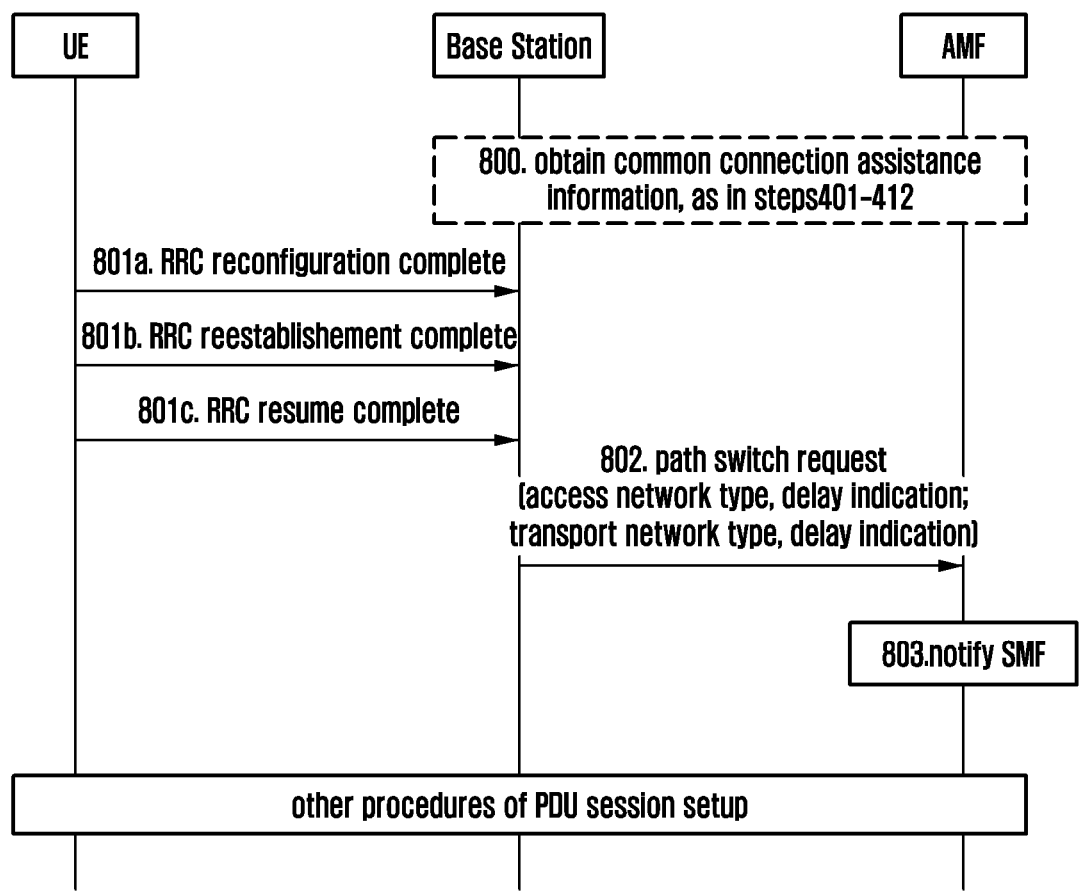
FIG. 8 illustrates still another connection setup method according to an embodiment of the present disclosure.

FIG. 8 illustrates another connection setup method according to an embodiment of the present disclosure. A detailed description of the steps unrelated to the present disclosure is omitted in the description of FIG. 8. The method includes the following steps:

In step 800, the base station or AMF may obtain a common connection assistance information of the cell or node under the base station according to steps 401 to 412. The base station or AMF can query common connection assistance information according to the information of the cell, node ID and/or UP ID and the like of the UE connection to obtain the UE specific connection assistance information.

In step 801a, if in the handover procedure, the UE transmits an RRC reconfiguration complete message to the base station to indicate the completion of handover.

In step 801*b*, if in the re-establishment procedure, the UE transmits an RRC re-establishment complete message to the base station to indicate the completion of the RRC re-establishment.

In step 801*c*, if in the resume procedure, the UE transmits an RRC resume complete message to the base station to indicate the RRC connection resume.

If under the architecture in which the CU is separated from the DU, the message of step 801*a* to step 801*c* is carried by the uplink RRC message transmitted to the CU by the DU, and the UE specific connection assistance information can be carried in the message, as described in UE specific access network connection assistance information in step 502.

Step 802, the base station receives the message described in step 801, if the base station is not the last serving base station of the UE, the base station (or CU of the base station) transmits a path switch request message to the AMF, and the message may contain the UE specific connection assistance information, which may include an access network type and/or a delay indication, and/or a transport network type and/or a delay indication to be used by the UE, and the specific content is described as the UE specific connection assistance information in step 302. The information can be obtained by configuration, and also may be obtained by querying according to the common connection assistance information in step 800 and the information of current node, cell and UP and the like of the UE.

In step 803, after obtaining the new UE specific connection assistance information, the AMF can transmit it to the SMF through the update session management context request message, and the information can be obtained by step 800 or step 802.

The AMF can query and obtain the UE specific connection assistance information according to the common connection assistance information obtained in step 800 and the information of the node, cell and/or UP and the like where the UE is located or to be used by UE, or may obtain the UE specific connection assistance information through step 802. After obtaining the latest UE specific connection assistance information, the AMF saves the information, directly or indirectly obtains the delay of the CP and/or UP connection that the UE is using or will use according to the content of the information, so as to adjust the parameters, and forwards the information to other nodes, such as the SMF or PCF, when necessary.

After receiving the UE specific connection assistance information, the SMF can directly or indirectly obtain the CP and/or CP connection delay that the UE is using or will use according to the content of the information, so as to adjust the parameters, such as timer, QoS parameters, etc., and can also perform QoS management according to the information, so as to better meet the user's service quality requirements.

Yet another connection setup method is described above in combination with FIG. 8. The signalling procedure between entities such as the UE, the base station, the AMF and the like is shown in FIGURER. Additionally or alternatively, each of the entities shown in FIG. 8 can be replaced with another entity or a combination of multiple entities capable of achieving the same or similar functions in the existing or future network, and any signalling (or message) transmitted between the entities shown in FIG. 8 can be replaced with another signalling (or message) capable of achieving the same or similar functions in the existing or future network.

Through the method described in connection with FIG. 8, when establishing the connection between the UE and the core network, the node or entity in the network can obtain the connection assistance information indicating the network characteristics of another network such as the NTN, so that the network parameters can be adjusted according to the connection assistance information, which can be used for functions such as QoS management or policy charging and the like, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

Figure 9:
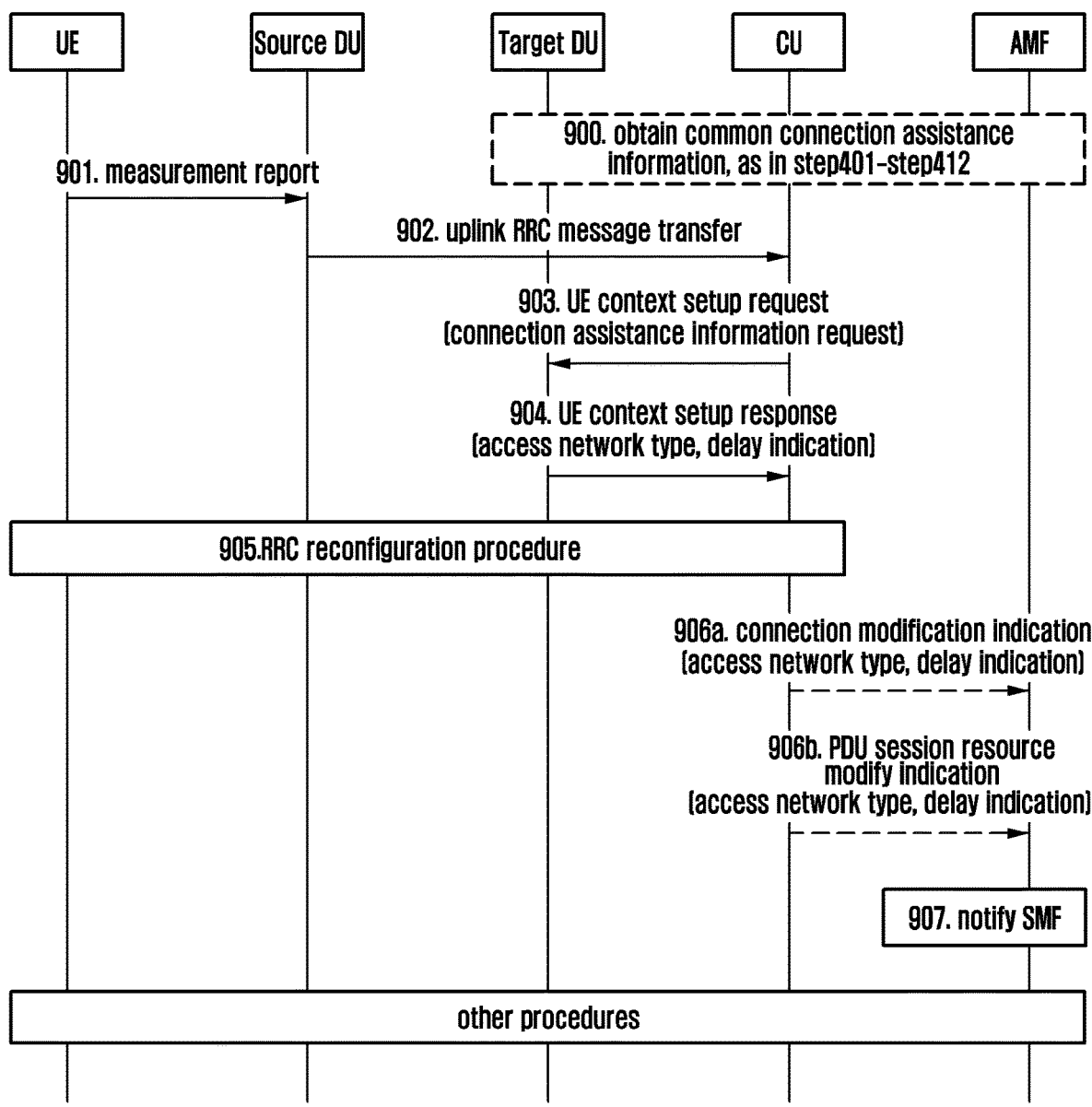
FIG. 9 illustrates still another connection setup method according to an embodiment of the present disclosure.

FIG. 9 illustrates yet another connection setup method according to an embodiment of the present disclosure. Detailed description of steps unrelated to the present disclosure is omitted in the description of FIG. 9. The method includes the following steps:

In step 900, if under the architecture in which the CU is separated from the DU, the CU or the AMF can obtain the corresponding common connection assistance information of the cell under the DU according to steps 401 to 412. The CU or AMF can query the common connection assistance information according to the information of the node, cell and/or UP and the like that is connected or to be connected by the UE to obtain the UE specific connection assistance information.

In step 901, the UE transmits a measurement report message to the source DU, which contains the measurement results of the target DU. The source DU receives the message.

In step 902, the source DU transmits an uplink RRC message transfer message to the CU, which includes the measurement report message in step 901. The CU receives the message.

In step 903, the CU transmits a UE context create request message to the target DU to establish the UE context, and a connection assistance information request can be carried in the message, and the request indicates that the target DU feeds back the access network connection assistance information to be used by the UE after the UE hands over to the target DU. The request may include at least one of the following:

Connection assistance information request indication, used for indicating a request for the UE specific connection assistance information, which may include a connection assistance information request for the control plane and/or the user plane of the access network;

Access network connection assistance information request indication, used for indicating a request for the UE specific access network connection assistance information, which may include a control plane indication and/or a user plane connection assistance information request indication;

The target DU receives the message and establishes a context for UE.

In step 904, the target DU transmits a UE context setup response message to the CU, and the message may contain the UE specific network assistance information, of which the transmission may be triggered in response to the connection assistance information request in step 903 or may be triggered by the target DU's own configuration. The information may include an access network type and/or a delay indication to be used by UE, and the specific content is described as the UE specific access network connection assistance information in step 502.

In step 905, after the CU performs the RRC reconfiguration procedure, the UE completes the handover from the source DU to the target DU.

In step 906a, if the UE has no PDU session, the CU transmits a connection modification indication message to the AMF, and the message contains the updated UE specific assistance information, which may include the access network type and/or delay indication to be used by UE, and information may be obtained by step 900 or step 904.

In step 906b, if the UE has a PDU session, the CU transmits a PDU session resource modify indication message to the AMF, and the message contains the updated UE specific network assistance information, which may include the access network type and/or delay indication to be used by UE. The information may be obtained by step 900 or step 904.

In step 907, after obtaining the updated UE specific connection assistance information, the AMF will transmit the update session management context request message to the SMF, and the required information is obtained by step 900 or step 906.

The AMF can query and obtain the UE specific connection assistance information according to the common connection assistance information obtained by step 900 and the information of the node, cell and/or UP and the like where the UE is located or to be used by the UE, or may obtain the UE specific connection assistance information through step 906. After obtaining the latest UE specific connection assistance information, the AMF saves the information, and according to the content of the information, directly or indirectly obtains the delay of the CP and/or UP connection that the UE is using or will use, so as to adjust the parameters, and transmit the information to other nodes, such as the SMF or PCF, when necessary.

After receiving the UE specific connection assistance information, the SMF can directly or indirectly obtain the CP and/or CP connection delay that the UE is using or will use according to the content of the information, so as to adjust the parameters, such as timer, QoS parameters, etc., and can also perform QoS management according to the information, so as to better meet the user's service quality requirements.

Yet another connection setup method is described above in combination with FIG. 9. The signalling procedure between entities such as UE, AMF, and the source DU, the target DU, and CU of the base station in the CU-DU separation architecture and the like is shown in FIG. 9. Additionally or alternatively, each of the entities shown in FIG. 9 can be replaced with another entity or a combination of multiple entities capable of achieving the same or similar functions in the existing or future network, and any signalling (or message) transmitted between the entities shown in FIG. 9 can be replaced with another signalling (or message) capable of achieving the same or similar functions in the existing or future network.

Through this method, enable the node or entity in the network to obtain the connection assistance information indicating the network characteristics of another network such as the NTN when the UE is going to establish a connection with a new DU (such as handover between DUs), so that the network parameters can be adjusted according to the connection assistance information, which can be used for functions such as QoS Management or policy charging and the like, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

Figure 10:
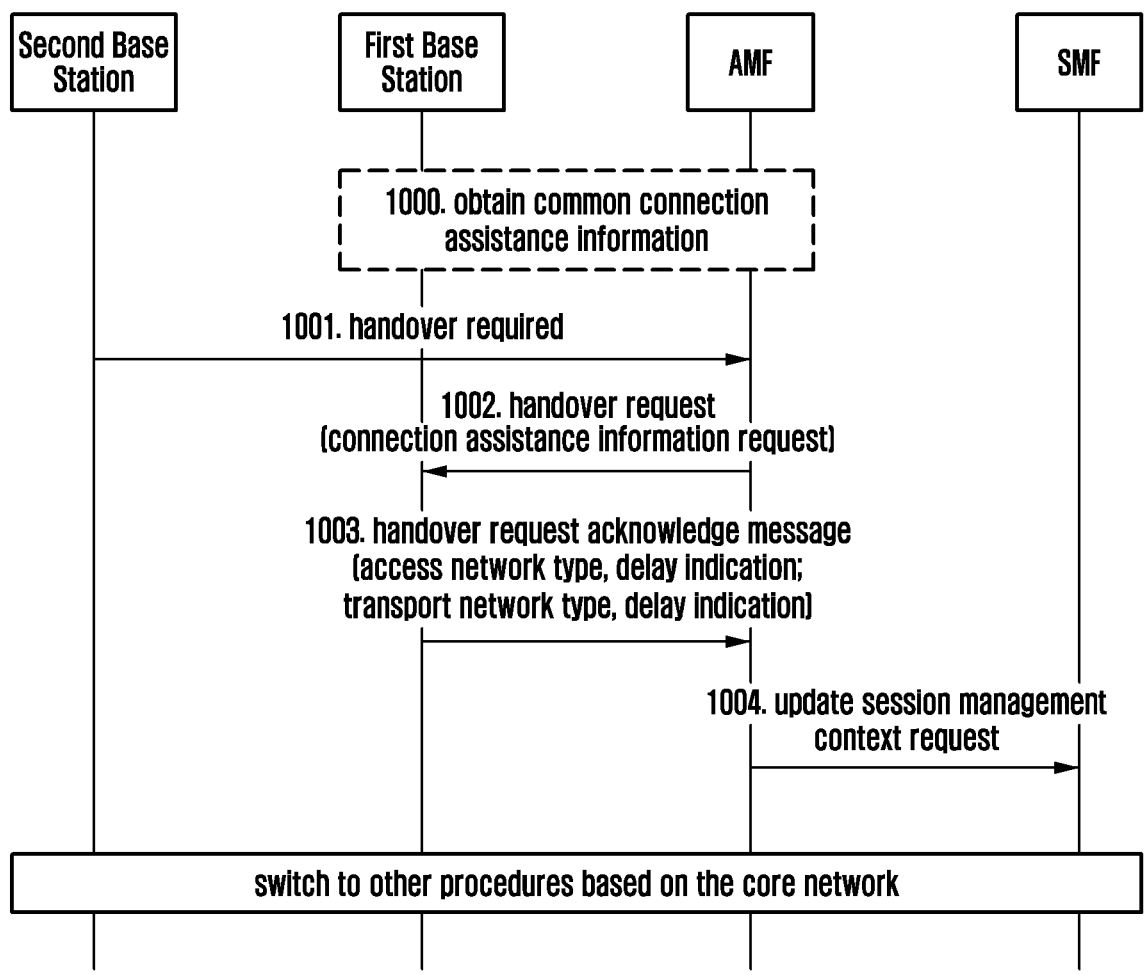
FIG. 10 illustrates still another connection setup method according to an embodiment of the present disclosure.

FIG. 10 illustrates yet another connection setup method according to an embodiment of the present disclosure. Detailed description of steps unrelated to the present disclosure is omitted in the description of FIG. 10. The method includes the following steps:

In step 1000, the AMF can obtain the corresponding common connection assistance information of the cell or node under the first base station according to steps 401 to 412. The AMF can query the common connection assistance information according to the information of the node, cell and/or UP and the like that is connected by the UE or to be connected by the UE to obtain the UE specific connection assistance information.

In step 1001, the second base station transmits a handover required message to the AMF, in which the information of the ID and the cell ID of the first base station and the like can be carried. The AMF receives the message.

In step 1002, the AMF transmits a handover request message to the first base station. The message can carry a connection assistance information request, which is used to indicate the UE specific connection assistance information to be used by the UE under the first base station after the handover request is passed by the first base station. The requested connection assistance information may include a connection assistance request to an access network and/or a transport network. The request may include at least one of the following:

Connection assistance information request indication, used for indicating a request for the UE specific connection assistance information, which may include a connection assistance information request for the control plane and/or the user plane of the access network and/or the transport network;

Access network connection assistance information request indication, used for indicating a request for the UE specific access network connection assistance information, which may include a control plane indication and/or a user plane connection assistance information request indication;

Transport network connection assistance information request indication, used for indicating a request for the UE specific transport network connection assistance information, which may include a control plane indication and/or a user plane connection assistance information request indication.

The first base station receives the message.

In step 1003, the first base station (or CU of the first base station) feeds back a handover request acknowledge message to the AMF, and the message can carry the UE specific connection assistance information that will be used by the UE after the UE hands over under the first base station. The transmission of the information can be triggered by responding to the connection assistance information request in step 1002, or by the first base station's own configuration. The content of the message may include an access network type and/or a delay indication, and/or a transport network type and/or a delay indication, and the specific content description is described as the UE specific connection assistance information in step 302.

In step 1004, the AMF transmits an update session management context request message to the SMF, and the message can carry the UE specific connection assistance information to be used after the UE hands over, and the information can be obtained through step 1000 or step 1003.

In step 1005, the AMF transmits an update session management context request message to the SMF, and the message contains the UE specific connection assistance information, which can be obtained by step 1000 or step 1004.

The AMF can query and obtain the UE specific connection assistance information according to the common connection assistance information obtained by step 1000 and the information of the node, cell and/or UP and the like where the UE is located or to be used by the UE, or may obtain the UE specific connection assistance information through step 1004. After obtaining the latest UE specific connection assistance information, the AMF saves the information, and according to the content of the information, directly or indirectly obtains the delay of the CP and/or UP connection that the UE is using or will use, so as to adjust the parameters, and transmit the information to other nodes, such as the SMF or PCF, when necessary.

After receiving the UE specific connection assistance information, the SMF can directly or indirectly obtain the CP and/or CP connection delay that the UE is using or will use according to the content of the information, so as to adjust the parameters, such as timer, QoS parameters, etc., and can also perform QoS management according to the information, so as to better meet the user's service quality requirements.

Yet another connection setup method is described above in combination with FIG. 10. The signalling procedure between entities such as the first base station, the second base station, the AMF, and the SMF and the like is shown in FIG. 10. Additionally or alternatively, each of the entities shown in FIG. 10 can be replaced with another entity or a combination of multiple entities capable of achieving the same or similar functions in the existing or future network, and any signalling (or message) transmitted between the entities shown in FIG. 9 can be replaced with another signalling (or message) capable of achieving the same or similar functions in the existing or future network.

Through the method described in connection with FIG. 10, it is possible to enable the node or entity in the network to obtain the connection assistance information indicating the network characteristics of another network such as the NTN when the UE is going to establish a connection with a new base station and needs to make resource preparation through the core network (such as handover based on the core network), so that the network parameters can be adjusted according to the connection assistance information, which can be used for functions such as QoS Management or policy charging and the like, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

Figure 11:
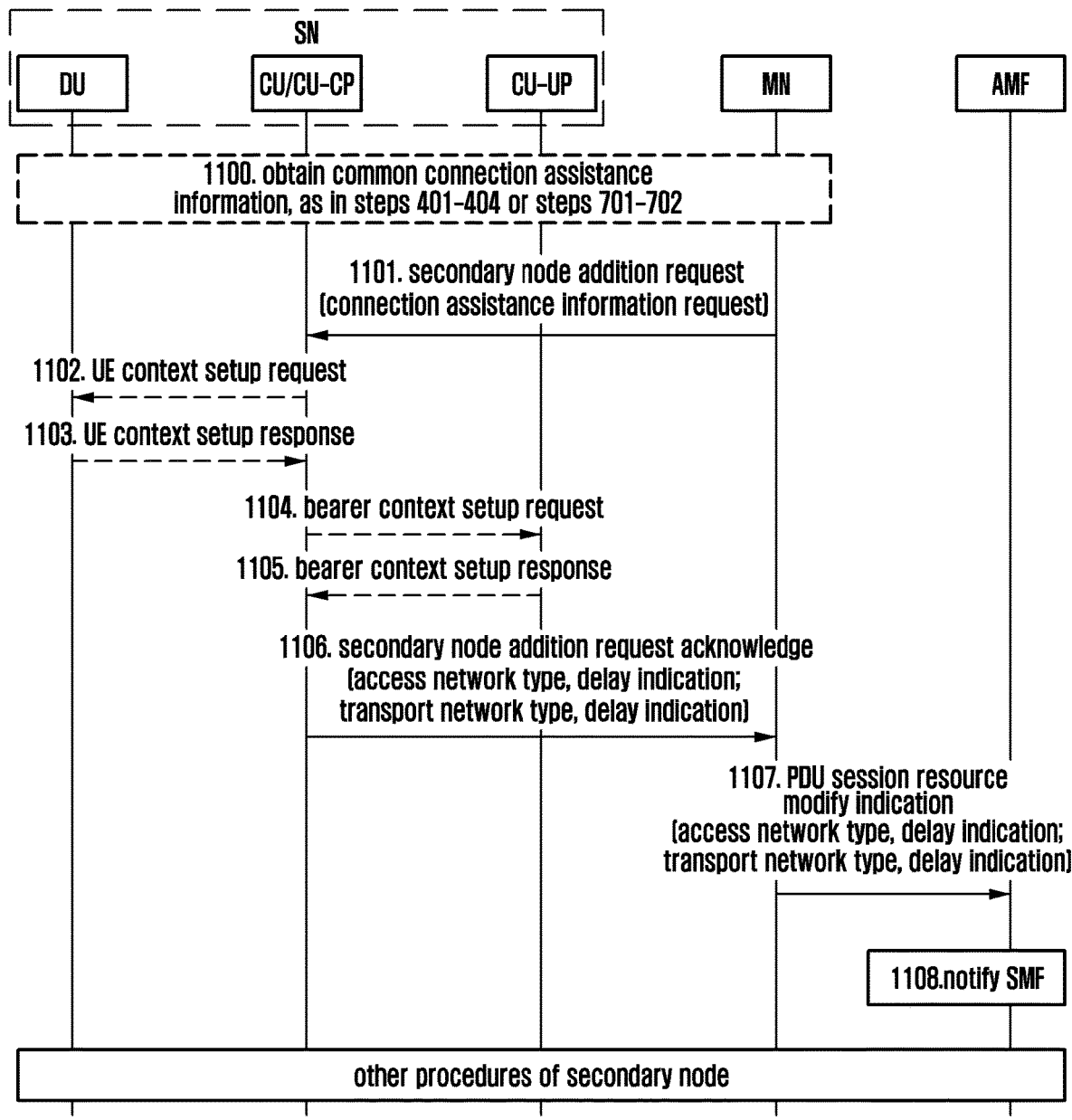
FIG. 11 illustrates still another connection setup method according to an embodiment of the present disclosure.

FIG. 11 illustrates yet another connection setup method according to an embodiment of the present disclosure. Detailed description of steps unrelated to the present disclosure is omitted in the description of FIG. 11. The method includes the following steps:

In step 1100, if the SN (secondary node) is under a separation architecture, the SN may include the DU, the CU or CU-CP, DU. The SN may obtain the corresponding common connection assistance information of the cell and/or node under the SN according to steps 401 to 404 or steps 407 to 410. The MN (master node) may obtain the corresponding common connection assistance information of the cell and/or node under the SN according to steps 701 to 702. The SN or MN can query the common connection assistance information according to the cell or node connected by the UE, to obtain the UE specific connection assistance information.

The MN is a wireless access node in MR-DC (Multi-RAT Dual Connectivity), which is responsible for the control plane connection between the UE and the core network. For example, the MN may be a base station, but is not limited to this. The SN is a wireless access node in MR-DC, which has no control plane connection with the core network and provides an additional user plane connection for the UE. For example, the SN may be a base station, but is not limited to this.

In step 1101, the MN transmits a secondary node addition request message to the SN. The message can carry a connection assistance information request, which is used to indicate that the SN needs to feed back the UE specific connection assistance information of the UE on the SN to the SN after selecting the SCG for the UE. The requested connection assistance information may include a connection assistance request to an access network and/or a transport network. The request may include at least one of the following:

Connection assistance information request indication, used for indicating a request for the UE specific connection assistance information, which may include a connection assistance information request for the control plane and/or the user plane of the access network and/or the transport network;

Access network connection assistance information request indication, used for indicating a request for the UE specific access network connection assistance information, which may include a control plane indication and/or a user plane connection assistance information request indication;

Transport network connection assistance information request indication, used for indicating a request for the UE specific transport network connection assistance information, which may include a control plane indication and/or a user plane connection assistance information request indication.

The SN receives the message.

Steps 1102 to 1103 occur under the architecture of separation of the CU and DU, and the specific messages and information are consistent with steps 903 to 904, which will not be repeated here.

Steps 1104 to 1105 occur under the architecture of separation of the CU-CP and CU-UP, and the specific messages and information are consistent with steps 607 to 608, which will not be repeated here.

In step 1106, the SN transmits a secondary node addition request acknowledge message to the MN, which can carry the UE specific connection assistance information after the secondary node is added. The transmission of the information may be triggered by responding to the connection assistance information request in step 1101 or by the configuration of the SN itself. The information may be obtained by step 1100, step 1103 and/or step 1105, and the information may include access network connection assistance information and/or transport network connection assistance information, and specifically may include at least one of the following items:

Transport network connection assistance information, which may include at least one of the following items:

User plane connection ID, indicating the user plane connection to be used by the UE, which can be a specific GTP tunnel, and can be identified by GTP-TEID and/or IP address and the like;

Network type, indicating the user plane connection network type to be used by the UE, which can be GEO, MEO or LEO, or other forms;

Delay indication, indicating the one-way theoretical delay of the user plane GTP tunnel that the UE is using or will use, if the connection includes a ground gateway, the delay may include the influence of the ground gateway position.

Access network connection assistance information, which may include at least one of the following items:

Access network connection ID, used for indicating the access network connection to be used by the UE, which can be a cell ID that indicates the service cell where the UE is located and may include a primary service cell and/or a secondary service cell, and which also can be an access network user plane ID that is used to indicate the UP connection of the access network, such as DRB ID, etc.;

Network type, indicating the network type of an access network connection to be used by UE, which can be GEO, MEO or LEO, or other forms;

Delay indication, indicating the one-way theoretical delay of the UE access network, which can include fronthaul network part. If the connection includes a ground gateway, the delay may include the influence of the location of the ground gateway.

The MN receives the message.

In step 1107, the MN (or CU of MN) transmits a PDU session resource modify indication message to the AMF, in which the UE specific connection assistance information on the secondary node after adding the secondary node can be carried. The information can be obtained by step 1100 or step 1106, and specifically can include the following contents, as described in step 1106.

In step 1108, the AMF transmits an update session management context request message to the SMF, in which the UE specific connection assistance information updated in step 1107 can be carried.

After obtaining the latest UE specific connection assistance information, the AMF saves the information, and according to the content of the information, directly or indirectly obtains the delay of the CP and/or UP connection that the UE is using or will use, so as to adjust the parameters, and transmit the information to other nodes, such as the SMF or PCF, when necessary.

After receiving the latest UE specific connection assistance information, the SMF can directly or indirectly obtain the CP and/or CP connection delay that the UE is using or will use according to the content of the information, so as to adjust the parameters, such as timer, QoS parameters, etc., and can also perform QoS management according to the information, so as to better meet the user's service quality requirements.

Yet another connection setup method is described above in combination with FIG. 11. The signalling procedure between entities such as the main node (MN), the AMF, and the DU, CU/CU-UP, CU-UP of the secondary node (SN) in the CU-DU separation architecture and the like is shown in FIG. 11. Additionally or alternatively, each of the entities shown in FIG. 11 can be replaced with another entity or a combination of multiple entities capable of achieving the same or similar functions in the existing or future network, and any signalling (or message) transmitted between the entities shown in FIG. 11 can be replaced with another signalling (or message) capable of achieving the same or similar functions in the existing or future network.

Through the method described in connection with FIG. 11, it is possible to enable the node or entity in the network to obtain the connection assistance information indicating the network characteristics of another network such as the NTN when updating the connection (such as adding a secondary node) for the UE, so that the network parameters can be adjusted according to the connection assistance information, which can be used for functions such as QoS Management or policy charging and the like, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

Figure 12:
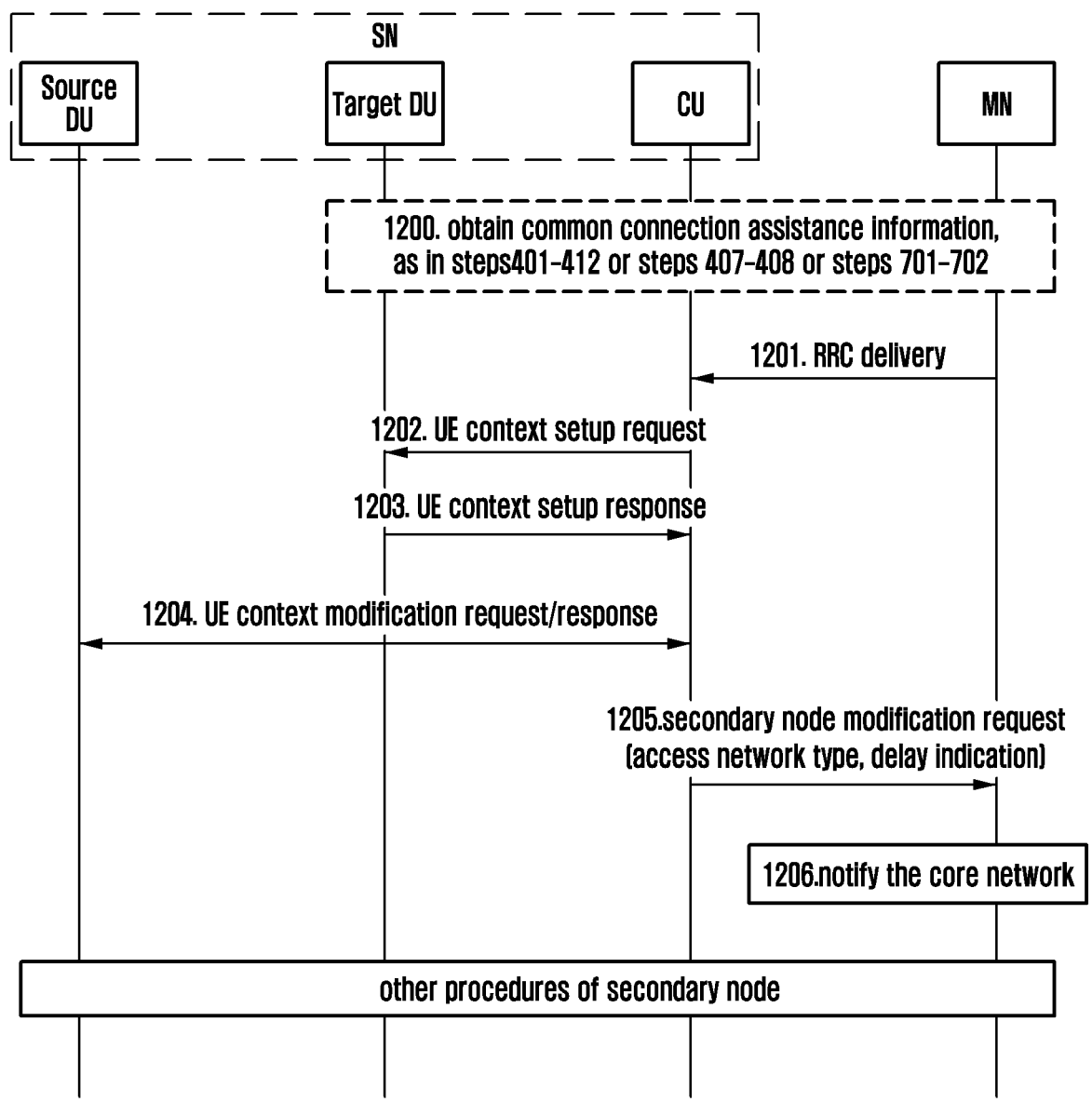
FIG. 12 illustrates still another connection setup method according to an embodiment of the present disclosure.

FIG. 12 illustrates yet another connection setup method according to an embodiment of the present disclosure. Detailed description of steps unrelated to the present disclosure is omitted in the description of FIG. 12. The method includes the following steps:

In step 1200, if in a separation architecture, the SN can include a source DU, a target DU, and CU. The CU under the SN can obtain the corresponding common connection assistance information of the cell under the target DU under the SN according to steps 401 to 402 or steps 407 to 408. The MN can obtain the common connection assistance information of all cells under the SN according to step 701 to step 702. The CU or MN in the SN can query the common connection assistance information according to the cell ID to be connected by the UE after the UE hands over to the target DU to obtain the UE specific connection assistance information of the UE under the target DU.

In step 1201, the MN transmits an RRC delivery message to the CU under the SN, and the message contains the information of the target DU. The CU under the SN receives the message.

In steps 1202 to 1203 are consistent with steps 903 to 904, and will not be repeated here.

In step 1204, the UE context modification procedure is executed between the CU and the source DU under the SN.

In step 1205, the CU under the SN transmits the secondary node modification request message to the primary base station, which can carry the UE specific connection assistance information after the UE hands over to the target DU. The transmission of the information can be triggered in response to MN's previous connection assistance information request or by SN's own configuration. The information mainly includes access network connection assistance information, and the specific content can include at least one of the following items:

Access network connection ID, used for indicating the access network connection to be used by UE, which can be a cell ID that indicates the service cell where the UE is located and may include a primary service cell and/or a secondary service cell, and which also can be an access network user plane ID that is used to indicate the UP connection of the access network, such as DRB ID, etc.;

Network type, indicating the network type of access network connection to be used by the UE, which can be GEO, MEO or LEO, or other forms;

Delay indication, which indicates the one-way theoretical delay of the UE access network, which can include fronthaul network part. If the connection includes a ground gateway, the delay may include the influence of the location of the ground gateway.

The MN receives the message.

In step 1206, the MN may transmit a new UE specific connection assistance information to the core network before or after the UE is handed over to the target DU, and the information can be obtained through step 1200 or step 1205. The detailed message is consistent with steps 1107 to 1108, and the specific content of the information is described as step 1205.

After obtaining the latest UE specific connection assistance information, the AMF saves the information, and according to the content of the information, directly or indirectly obtains the delay of the CP and/or UP connection that the UE is using or will use, so as to adjust the parameters, and transmit the information to other nodes, such as the SMF or PCF, when necessary.

After receiving the UE specific connection assistance information, the SMF can directly or indirectly obtain the CP and/or CP connection delay that UE is using or will use according to the content of the information, so as to adjust the parameters, such as timer, QoS parameters, etc., and can also perform QoS management according to the information, so as to better meet the user's service quality requirements.

Another method of connection setup is described above in combination with FIG. 12. The signalling procedure between entities such as the main node (MN), and the source DU, the target DU, and the CU of the secondary node (SN) in the CU-DU separation architecture and the like is shown in FIG. 12. Additionally or alternatively, each of the entities shown in FIG. 12 can be replaced with another entity or a combination of multiple entities capable of achieving the same or similar functions in the existing or future network, and any signalling (or message) transmitted between the entities shown in FIG. 12 can be replaced with another signalling (or message) capable of achieving the same or similar functions in the existing or future network.

Through the method described in connection with FIG. 12, it is possible to enable the node or entity in the network to obtain the connection assistance information indicating the network characteristics of another network such as the NTN when the connection of the UE changes (such as the UE secondary node), so that the network parameters can be adjusted according to the connection assistance information, which can be used for functions such as QoS Management or policy charging and the like, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

Figure 13:
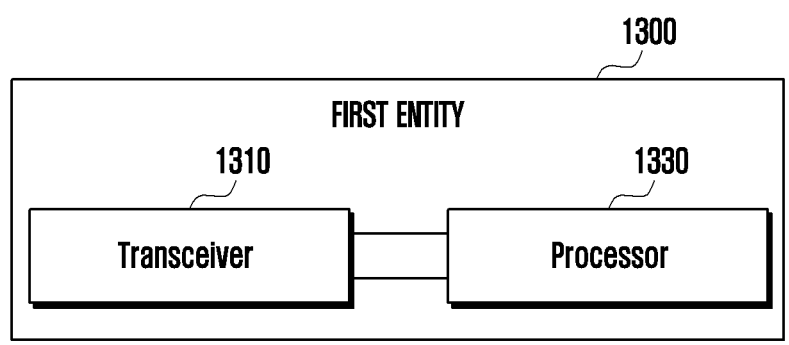
FIG. 13 illustrates a first entity according to an embodiment of the present disclosure.

FIG. 13 is a block diagram showing the structure of the first entity according to an embodiment of the present disclosure.

Referring to FIG. 13, the first entity 1300 includes a transceiver 1310 and a processor 1330. The first entity 1300 may be, but not limited to, a base station, a DU, a CU, a CU-UP, a CU-CP, or a core network node. The core network node can be, but not limited to, an AMF, an SMF, a PCF, etc.

The transmitter 1310 may be configured to transmit signals to and/or receive signals from the outside. The processor 1330 may be configured to control the transceiver to transmit the connection assistance information to a second entity 1400 different from the first entity 1300. The first entity 1300 may be realized in the form of hardware, software or a combination of hardware and software so that it can perform any one or more steps of any method described in the present disclosure.

Figure 14:
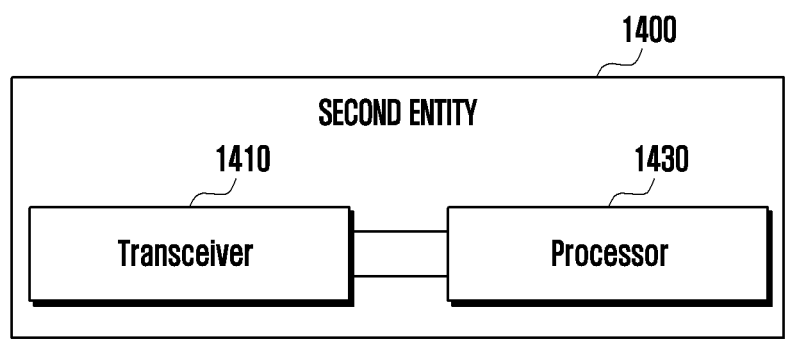
FIG. 14 illustrates a second entity according to an embodiment of the present disclosure.

FIG. 14 is a block diagram showing the structure of the second entity according to an embodiment of the present disclosure.

Referring to FIG. 14, the second entity 1400 includes a transceiver 1410 and a processor 1430. The second entity 1400 may be, but not limited to, a base station, a DU, a CU, a CU-UP, a CU-CP, or a core network node. The core network node can be, but not limited to, an AMF, an SMF, a PCF, etc.

The transmitter 1410 may be configured to transmit signals to and/or receive signals from the outside. The processor 1430 may be configured to control the transceiver to receive the connection assistance information from the first entity 1300 different from the second entity 1400. The second entity 1400 may be realized in the form of hardware, software or a combination of hardware and software so that it can perform any one or more steps of any method described in the present disclosure.

Figure 15:
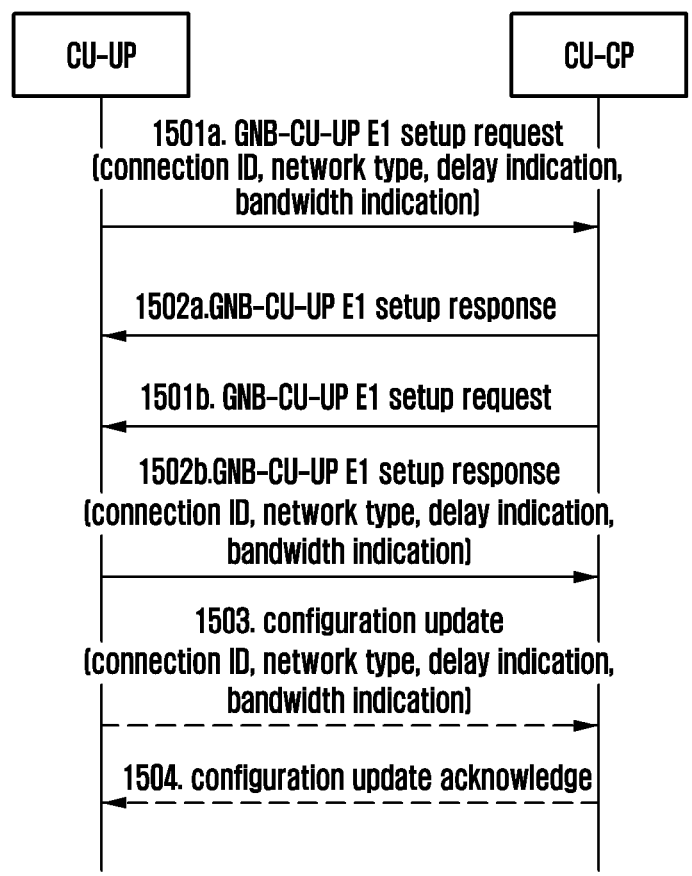
FIG. 15 illustrates still another connection setup method according to an embodiment of the present disclosure.

FIG. 15 illustrates yet another connection setup method according to an embodiment of the present disclosure. A detailed description of the steps unrelated to the present disclosure is omitted in the description of FIG. 15. The method includes the following steps:

In step 1501*a*: if the first transport network layer association is initiated by the CU-UP, the CU-UP transmits the GNB-CU-UP E1 setup request message to the CU-CP, and the message can contain the connection assistance information, and the information can be one or more user plane transport network layer connection information, and each connection information can contain at least one of the following contents:

Connection ID, used for indicating a specific user plane transport network layer connection, which can be GTP transmission layer address information, an ID index corresponding to a specific connection, or other forms;

Network type, indicating the transport network type used by the connection corresponding to the connection ID, which can be GEO, MEO, LEO, HEO, HAPS, UAS, above-water node, underwater node, etc., or other forms;

Delay indication, indicating the one-way theoretical delay of data on the connection, if the connection includes a ground gateway, the delay may include the influence of the ground gateway position.

Bandwidth indication, indicating the transmission capacity that the connection can support.

The user plane transport network layer connection information may be transmitted by being included in the transmission user plane address information or may be transmitted independently of the address information.

In step 1502*a*, the CU-CP receives and saves the connection assistance information, and transmits the GNB-CU-UP E1 setup response message to the CU-UP.

In step 1501*b*, if the first transport network layer association is initiated by the CU-CP, the CU-CP transmits the GNB-CU-CP E1 setup request message to the CU-CP, which may contain a connection assistance information request indication to request to obtain user plane transport network layer connection information, which can be a request indication, or an indication for specific requests, such as request the network type, request the delay indication and/or request the bandwidth indication.

In step 1502*b*, the CU-UP receives the message and transmits the GNB-CU-CP E1 setup response message to the CU-CP, and the message can contain connection assistance information, which can be one or more user plane transport network layer connection information, according to the request information or self-configuration in step 1501, at least one of the following contents can be included in each connection information:

Connection ID, used for indicating a specific user plane transport network layer connection, which can be GTP transmission layer address information, and also can be an ID index corresponding to a specific connection, or other forms;

Network type, indicating the transport network type used by the connection corresponding to the connection ID, which can be GEO, MEO, LEO, HEO, HAPS, UAS, above-water node, underwater node, etc., or other forms;

Delay indication, indicating the one-way theoretical delay of data on the connection, if the connection includes a ground gateway, the delay may include the influence of the ground gateway position.

Bandwidth indication, indicating a transmission capacity that the connection can support. CU-CP receives the message and saves the information.

In step 1503, if the configuration information needs to be updated, the CU-UP transmits GNB-CU-UP E1 configuration update message to the CU-CP. The message may contain the connection assistance information, which may be one or more user plane transport network layer connection information, and the content of each connection information may be described as step 1501*a*.

In step 1504, the CU-CP receives and saves the information, and transmits the GNB-CU-UP configuration update acknowledge message to the CU-UP.

The CU-CP receives the user plane transport network layer connection information in the CU-UP and saves the information, and when selecting the CU-UP for the service requested by the UE, the CU-CP can select the appropriate CU-UP and/or transport network connection for the service requested by the UE according to each transport network layer connection information (such as network type, delay indication, bandwidth indication) in the information and other factors (such as load, etc.) need to be considered in the user plane selection. The CU-CP can also provide the information to the core network node when establishing an interface connection with the core network, establishing a UE context or PDU session, and the session management entity (such as the SMF) of the core network node can select for the UE the user plane function (UPF) and/or transmission connection that meets the service requirements of the UE according to the transport network layer connection information (such as network type, delay indication or bandwidth indication) provided in the connection assistance information.

Another connection setup method is described above in combination with FIG. 15. The signalling procedure between the CU-CP and the CU-UP entities under the CP-UP separation architecture is shown in FIG. 15. Additionally or alternatively, each of the entities shown in FIG. 15 can be replaced with another entity or a combination of multiple entities capable of achieving the same or similar functions in the existing or future network, and any signalling (or message) transmitted between the entities shown in FIG. 15 can be replaced with another signalling (or message) capable of achieving the same or similar functions in the existing or future network.

Through the method described in connection with FIG. 15, it is possible to enable the node or entity in the network to obtain the transport network layer connection information that can be provided for the user plane management entity (such as the CU-CP or SMF) to select in advance, and select the user plane node and/or transport network layer connection meeting the service requirements for the UE according to the information, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

Figure 16:
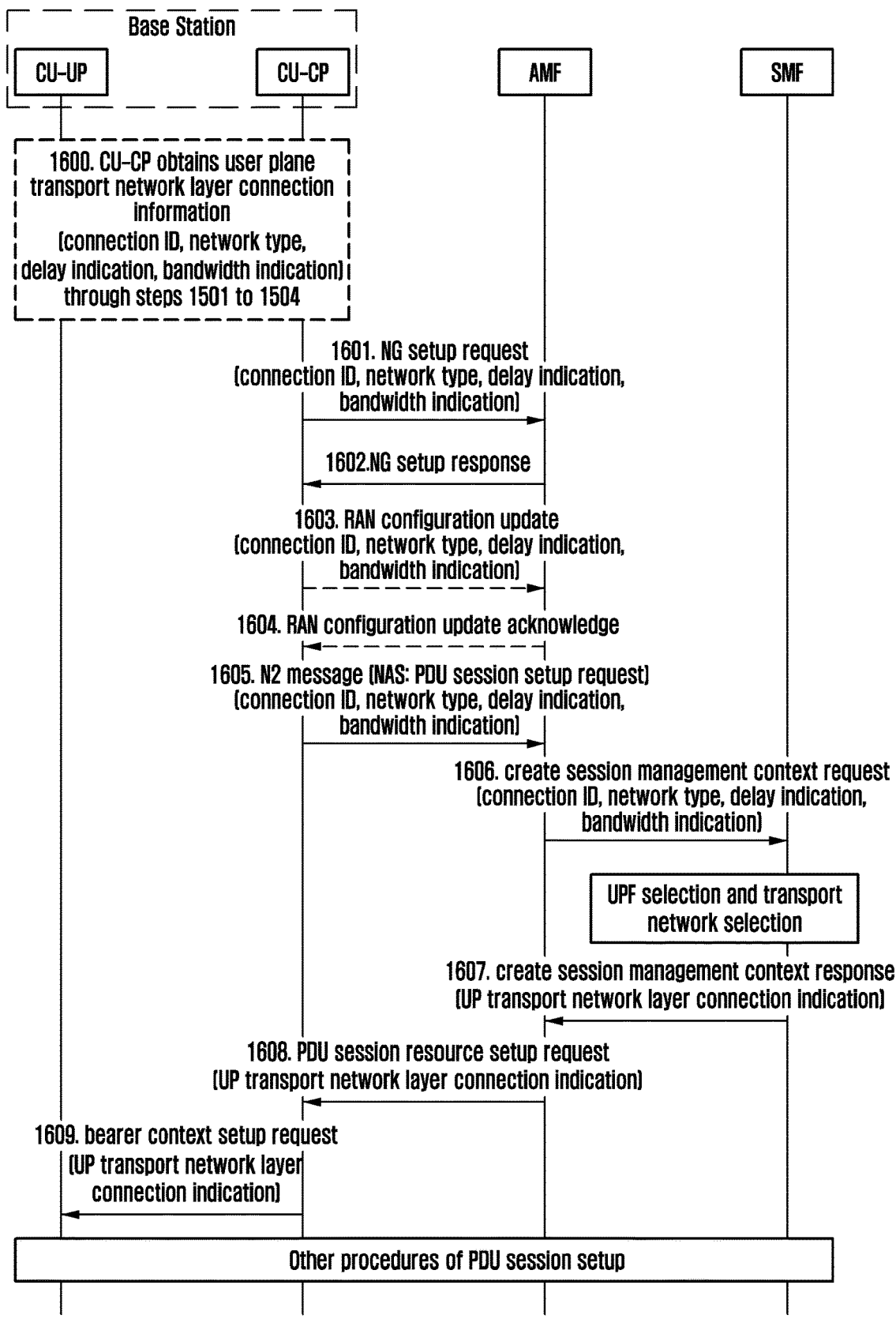
FIG. 16 illustrates still another connection setup method according to an embodiment of the present disclosure.

FIG. 16 illustrates yet another connection setup method according to an embodiment of the present disclosure. Detailed description of steps unrelated to the present disclosure is omitted in the description of FIG. 16. The method includes the following steps:

In step 1600, if the base station is under the CP-UP separation architecture, the CU-CP can obtain the user plane transport network layer connection information supported by all CU-UPs under the CU-CP through the procedure as steps 1501 to 1504, and the information can include the connection ID, network type, delay indication and/or bandwidth indication of each user plane transport network layer connection.

In step 1601, the base station/CU-CP transmits an NG setup request message to the AMF, and the message may contain connection assistance information, which may be one or more user plane transport network layer connection information, and in each connection information may contain at least one of the following contents:

Connection ID, used for indicating a specific user plane transport network layer connection, which can be GTP transmission layer address information, and also can be an ID index corresponding to a specific connection, or other forms;

Network type, indicating the transport network type used by the connection corresponding to the connection ID, which can be GEO, MEO, LEO, HEO, HAPS, UAS, above-water node, underwater node, etc., or other forms;

Delay indication, indicating the one-way theoretical delay of data on the connection, if the connection includes a ground gateway, the delay may include the influence of the ground gateway position.

Bandwidth indication, indicating a transmission capacity that the connection can support.

In step 1602, the AMF receives and saves the information, and transmits the NG setup response message to the base station/CU-CP.

In step 1603, if the base station/CU-CP has configuration information need to be updated, the base station/CU-CP transmits a RAN configuration update message to the AMF. The message may contain connection assistance information, which may be one or more user plane transport network layer connection information, and the content may be included in each information may be described as step 1601.

In step 1604, the AMF receives and saves the information, and transmits a RAN configuration update acknowledge message to the base station/CU-CP.

In step 1605, when receiving a NAS message from the UE containing a PDU session setup request, the base station transmits a N2 message to the AMF, which may be an initial UE message or an uplink NAS transport message. The message may contain connection assistance information, the information may be one or more user plane transport network layer connection information, and in each information may contain at least one of the following contents:

Connection ID, used for indicating a specific user plane transport network layer connection, which can be GTP transmission layer address information, and also can be an ID index corresponding to a specific connection, or other forms;

Network type, indicating the transport network type used by the connection corresponding to the connection ID, which can be GEO, MEO, LEO, HEO, HAPS, UAS, above-water node, underwater node, etc., or other forms;

Delay indication, indicating the one-way theoretical delay of data on the connection, if the connection includes a ground gateway, the delay may include the influence of the ground gateway position.

Bandwidth indication, indicating a transmission capacity that the connection can support.

The AMF receives the message.

In step 1606, after receiving a NAS message containing a PDU session setup request, the AMF transmits a create session management context request message to the SMF, and the message can contain all the user plane transport network layer connection information obtained from step 1601, step 1603 or step 1605 and supported by the base station, and the information includes the user plane transport network layer connection information that can be provided for the PDU session to select, in which contains the connection ID, network type, delay indication and/or bandwidth indication of each connection, and the specific content is consistent with the description in step 1601.

The SMF selects the appropriate UPF and/or user plane transport network layer connection for the PDU session requested by the UE according to the received information, combining the criteria of UPF selection (such as considering the information of UPF load, UE location and the like) and the user plane transport network layer connection information supported by the base station.

In step 1607, the SMF transmits a create session management context response message to the AMF, and the message may a contain user plane transport network layer connection indication selected for the PDU session, which is used for indicating the user plane transport network layer connection selected by the SMF for the base station. The indication can be included in the user plane transport network layer information, which can be a connection ID, an endpoint IP address, or a TEID, or in other forms.

The AMF receives the information.

In step 1608, the AMF transmits a PDU session resource setup request message to the base station/CU-CP, which includes the user plane transport network layer connection indication obtained from step 1607.

The base station/CU-CP receives the message.

In step 1609, if the base station is under CP-UP separation architecture, the CU-CP transmits a bearer context setup request message to the CU-UP, which includes the user plane transport network layer connection indication obtained from step 1608.

After receiving the user plane transport network layer connection indication, the base station/CU-UP assigns the port IP address and port number on the base station/CU-UP to the corresponding PDU session according to the information indicated, and feeds the assigned IP address and port number back to the core network user plane. In this way, the procedure of selection and setup of the user plane transport network layer connection is completed.

Yet another method of connection setup is described above in combination with FIG. 16. The signalling procedure between entities such as the CU-CP and CU-UP, the base station, the AMF and the SMF under the CP-UP separation architecture is shown in FIG. 16. Additionally or alternatively, each of the entities shown in FIG. 16 can be replaced with another entity or a combination of multiple entities capable of achieving the same or similar functions in the existing or future network, and any signalling (or message) transmitted between the entities shown in FIG. 16 can be replaced with another signalling (or message) capable of achieving the same or similar functions in the existing or future network.

Through the method described in connection with FIG. 16, it is possible to enable the node or entity in the network to obtain the transport network layer connection information that can be provided for the session management entity to select in advance or to obtain the transport network layer connection information that can be provided for the session management entity to select when establishing the connection, and select the user plane node and/or transport network layer connection meeting the service requirements for UE according to the information, thereby solving the problem caused by the delay after another network such as the NTN being integrated into the mobile communication system, which not only realizes expending service, enlarging service area and improving service quality using another network such as the NTN, but also ensures UE service experience, and finally increases the profits for operators.

Figure 17:
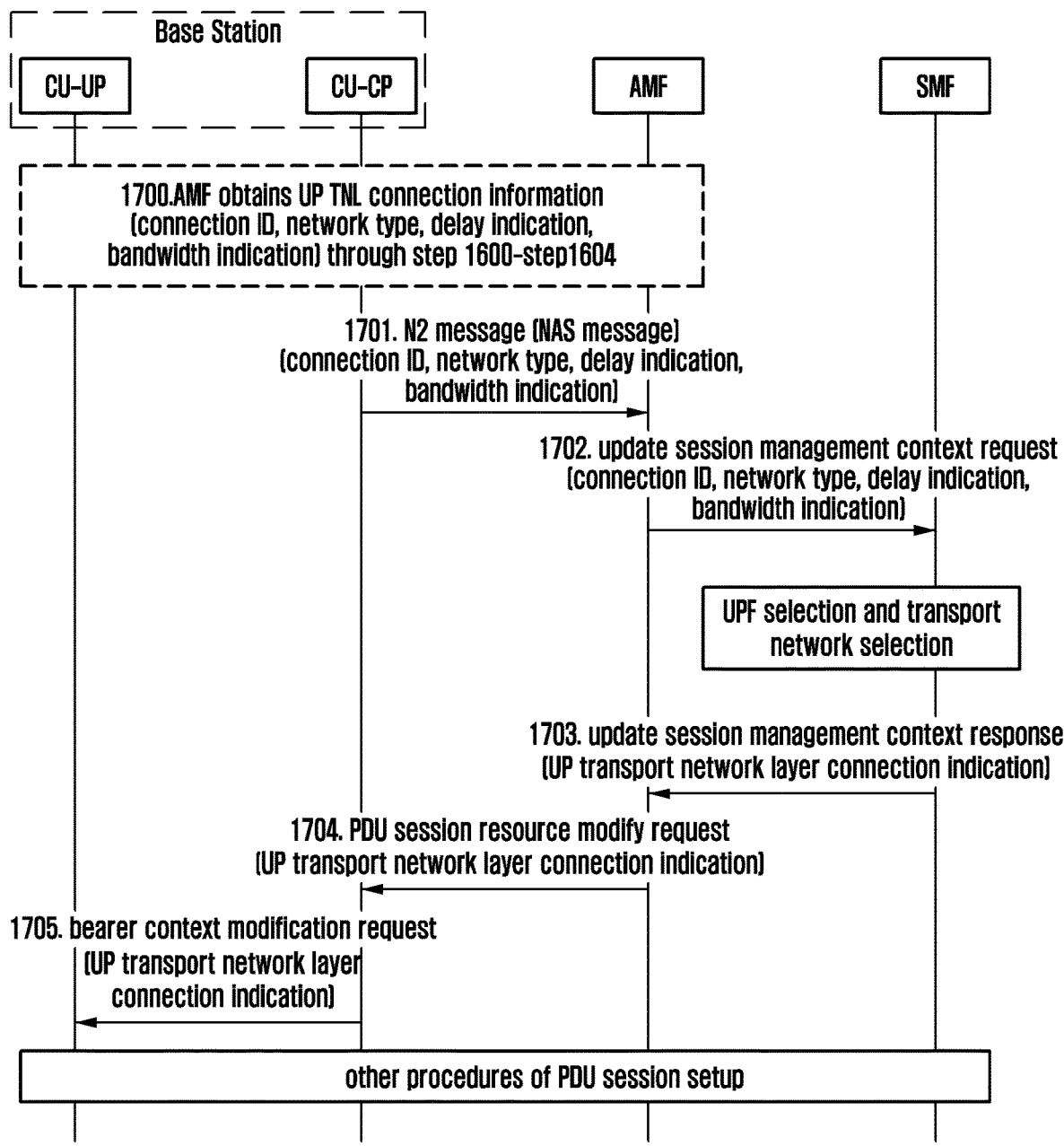
FIG. 17 illustrates still another connection setup method according to an embodiment of the present disclosure.

FIG. 17 illustrates yet another connection setup method according to an embodiment of the present disclosure. A detailed description of steps unrelated to the present disclosure is omitted in the description of FIG. 17. The method includes the following steps:

In step 1700, the AMF can obtain all user plane transport network layer connection information supported under the base station through the procedure as step 1600 to step 1604, and the information can include the user plane transport network layer connection information supported by one or more base stations, wherein each connection information may include a connection ID, a network type, a delay indication and/or a bandwidth indication, etc. The specific content description is consistent with the description of step 1601.

In step 1701, after the base station receives a NAS message containing a PDU session modify request or a service request from UE, a N2 message is transmitted to the AMF, which can be an initial UE context message or an uplink NAS transport message. The message may contain connection assistance information, which can be one or more user plane transport network layer connection information, and the information can include one or more user plane transport network layer connection information, of which each information can contain at least one of the following contents:

Connection ID, used for indicating a specific user plane transport network layer connection, which can be GTP transmission layer address information, and also can be an ID index corresponding to a specific connection, or other forms;

Network type, indicating the transport network type used by the connection corresponding to the connection ID, which can be GEO, MEO, LEO, HEO, HAPS, UAS, above-water node, underwater node, etc., or other forms;

Delay indication, indicating the one-way theoretical delay of data on the connection, if the connection includes a ground gateway, the delay may include the influence of the ground gateway position.

Bandwidth indication, indicating a transmission capacity that the connection can support.

In step 1702, after receiving the NAS message containing a service request, the AMF transmits an update session management context request message to the SMF, and the message can contain obtaining all user plane transport network layer connection information supported by the base station from step 1700 or step 1701, which includes user plane transport network layer connection information that can be provided for PDU session to select, in which including the connection ID, network type, delay indication and/or bandwidth indication of each connection, and the specific content is consistent with the description Step 1701.

The SMF selects the appropriate UPF and/or user plane transport network layer connection for the PDU session requested by the UE according to the received information, combining the criteria of UPF selection (such as considering the information of UPF load, UE location and the like) and the user plane transport network layer connection information supported by the base station.

In step 1703, the SMF transmits an update session management context response message to the AMF, and the message may contain a user plane transport network layer connection indication selected for the PDU session, which indicates the user plane transport network layer connection selected by the SMF for the base station. The indication can be included in the user plane transport network layer information, and can be a connection ID, an endpoint IP address, or a TEID, or in other forms.

The AMF receives the information.

In step 1704, the AMF transmits a PDU session resource modify request message to the base station/CU-CP, which includes the user plane transport network layer connection indication obtained from step 1703.

The base station/CU-CP receives the message.

In step 1705, if the base station is under the CP-UP separation architecture, the CU-CP transmits a bearer context modification request message to the CU-UP, which includes the user plane transport network layer connection indication obtained from step 1704.

After receiving the user plane transport network layer connection indication, the base station/CU-UP assigns the port IP address and port number on the base station/CU-UP to the corresponding PDU session according to the information indicated, and feeds the assigned IP address and port number back to the core network user plane. In this way, the procedure of selection and setup of the user plane transport network layer connection is completed.

Yet another method of connection setup is described above in combination with FIG. 17. The signalling procedure between entities such as the CU-CP and CU-UP, the base station, the AMF and the SMF and the like under the CP-UP separation architecture is shown in FIG. 17. Additionally or alternatively, each of the entities shown in FIG. 17 can be replaced with another entity or a combination of multiple entities capable of achieving the same or similar functions in the existing or future network, and any signalling (or message) transmitted between the entities shown in FIG. 17 can be replaced with another signalling (or message) capable of achieving the same or similar functions in the existing or future network.

Through the method described in connection with FIG. 17, it is possible to enable the node or entity in the network to obtain the transport network layer connection information that can be provide for the session management entity to select when the PDU session is restored or modified, and select the user plane node and/or transport network layer connection meeting the service requirements for the UE according to the information, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

Figure 18:
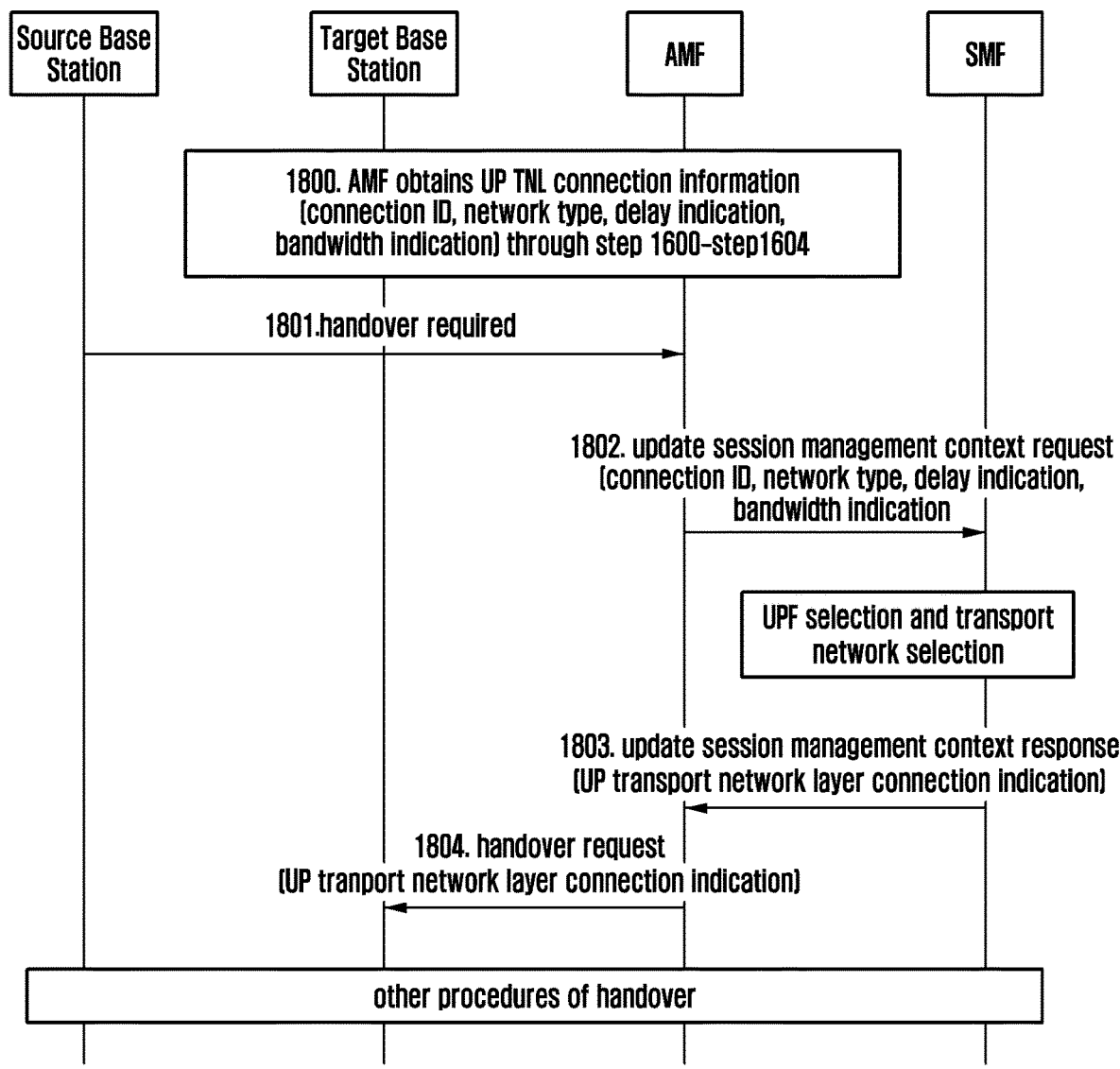
FIG. 18 illustrates still another connection setup method according to an embodiment of the present disclosure.

FIG. 18 illustrates yet another connection setup method according to an embodiment of the present disclosure. A detailed description of steps unrelated to the present disclosure is omitted in the description of FIG. 18. The method includes the following steps:

Step 1800, the AMF can obtain all user plane transport network layer connection information under the target base station through the procedure as step 1600 to step 1604, and the information can include the user plane transport network layer connection information supported by one or more base stations, wherein each connection information can contain a connection ID, a network type, a delay indication and/or a bandwidth indication, etc., and the specific content description is consistent with that of step 1601.

In step 1801, in the procedure of NG handover, the source base station transmits a handover required message to the AMF, wherein the ID information of the target base station is carried.

The AMF receives the message.

In step 1802, the AMF queries the user plane transport network connection information corresponding to the target base station ID, and transmits an update session management context request message to the SMF, and the message can include all user plane transport network layer connection information supported by the target base station obtained from step 1800, and the information can include one or more user plane transport network layer connection information, each of which can contain at least one of the following:

Connection ID, used for indicating a specific user plane transport network layer connection, which can be GTP transmission layer address information, and also can be an ID index corresponding to a specific connection, or other forms;

Network type, indicating the transport network type used by the connection corresponding to the connection ID, which can be GEO, MEO, LEO, HEO, HAPS, UAS, above-water node, underwater node, etc., or other forms;

Delay indication, indicating the one-way theoretical delay of data on the connection, if the connection includes a ground gateway, the delay may include the influence of the ground gateway position.

Bandwidth indication, indicating a transmission capacity that the connection can support.

The SMF receives the message, and selects the appropriate UPF and/or user plane transport network layer connection for the PDU session requested for handover by the UE according to the received information, combining the criteria of UPF selection (such as considering the information of UPF load, UE location and the like) and the user plane transport network layer connection information supported by the base station.

In step 1803, the SMF transmits an update session management context response message to the AMF, and the message may contain a user plane transport network layer connection indication selected for the PDU session, which indicates the user plane transport network layer connection selected by the SMF for the base station. The indication can be included in the user plane transport network layer information, and can be a connection ID, an endpoint IP address, or a TED, or in other forms.

The AMF receives the information.

In step 1804, the AMF transmits a handover request message to the target base station, which includes a user plane transport network layer connection indication obtained from step 1803.

The target base station receives the message.

After receiving the user plane transport network layer connection indication, the target base station assigns the port IP address and port number on the base station for the corresponding PDU session according to the information indicated, and feeds back the assigned IP address and port number to the core network user plane. In this way, the procedure of selection and setup of the user plane transport network layer connection is completed.

Yet another method of connection setup is described above in combination with FIG. 18. The signalling procedure between entities such as the source base station, the target base station, the AMF and the SMF and the like is shown in FIG. 18. Additionally or alternatively, each of the entities shown in FIG. 18 can be replaced with another entity or a combination of multiple entities capable of achieving the same or similar functions in the existing or future network, and any signalling (or message) transmitted between the entities shown in FIG. 18 can be replaced with another signalling (or message) capable of achieving the same or similar functions in the existing or future network.

Through the method described in connection with FIG. 18, it is possible to enable the node or entity in the network to obtain the transport network layer connection information that can be provided for the session management entity to select on the target base station during the handover process, and select the user plane node and/or transport network layer connection meeting the service requirements for UE according to the information, thereby solving the problem caused by the delay after another network such as the NTN being integrated into the mobile communication system, which not only realizes expending service, enlarging service area and improving service quality using another network such as the NTN, but also ensures the UE service experience, and finally increases the profits for operators.

According to one aspect of the present disclosure, a method is provided that is performed by a first entity in a wireless communication system, which comprises: transmitting connection assistance information to a second entity in a wireless communication system.

Optionally, the connection assistance information comprises at least one of the followings: a connection ID, a network type and a delay indication, a bandwidth indication and a connection indication.

Optionally, the connection assistance information is common connection assistance information, and wherein the common connection assistance information comprises at least one of access network connection assistance information of all cells under the first entity and transport network connection assistance information of all nodes under the first entity, and wherein the access network connection assistance information of all cells under the first entity comprises at least one of control plane connection assistance information of the access network and user plane connection assistance information of the access network, and wherein the transport network connection assistance information of all nodes under the first entity comprises at least one of control plane connection assistance information of the transport network and user plane connection assistance information of the transport network.

Optionally, the first entity, the second entity, and the common connection assistance information are configured as one of the followings: the first entity being a distribution unit DU, the second entity being a central control unit CU, and the common connection assistance information being included in an F1 interface setup message transmitted to the CU by the DU; the first entity being the DU and the second entity being the CU, and the common connection assistance information being included in a GNB-DU configuration update message transmitted to the CU by the DU; the first entity being the DU, the second entity being a central control unit-control plane CU-CP, and the common connection assistance information being included in an F1 interface setup message transmitted to the CU-CP by the DU; the first entity being the DU, the second entity being the CU-CP, and the common connection assistance information being included in a GNB-DU configuration update message transmitted to the CU-CP by the DU; the first entity being a central control unit-user plane CU-UP, and the second entity being the CU-CP, and the common connection assistance information being included in a GNB-CU-UP E1 setup request message transmitted to the CU-CP by the CU-UP; the first entity being the CU-UP, the second entity being the CU-CP, and the common connection assistance information being included in a GNB-CU-UP configuration update message transmitted to the CU-CP by the CU-UP; the first entity being the CU-UP, the second entity being the CU-CP, and the common connection assistance information being included in a GNB-CU-CP E1 setup response message transmitted to the CU-CP by the CU-UP; the first entity being a base station, the second being another base station different from the base station, and the common connection assistance information being included in an Xn setup request message transmitted by the base station to the other base station; the first entity being the base station, and the second entity being the other base station different from the base station, and the common connection assistance information being included in an Xn setup response message transmitted to the other base station by the base station; the first entity being the base station, and the second entity being the other base station different from the base station, and the common connection assistance information being included in an next generation-wireless access network NG-RAN configuration update message transmitted to the other base station by the base station; the first entity being the base station, the second entity being an access control and mobility management function entity AMF, and the common connection assistance information being included in a RAN configuration update message transmitted by the base station to the AMF; the first entity being the base station and the second entity being the AMF, and the common connection assistance information being included in an NG setup request message transmitted to the AMF by the base station.

Optionally, the connection assistance information is UE specific connection assistance information, wherein the UE specific connection assistance information comprises at least one of the followings: UE specific access network connection assistance information and UE specific transport network connection assistance information, and wherein, the UE specific access network connection assistance information comprises at least one of control plane connection assistance information of the access network and user plane connection assistance information of the access network, and wherein the UE specific transport network connection assistance information comprises at least one of control plane connection assistance information of the transport network and user plane connection assistance information of the transport network.

Optionally, the first entity, the second entity, and the UE specific connection assistance information are configured as one of the followings: the first entity being the DU, the second entity being the CU, and the UE specific connection assistance information being included in an uplink RRC message transfer message transmitted to the CU by the DU; the first entity being the DU, the second entity being the CU, and the UE specific connection assistance information being included in a UE context setup response message transmitted to the CU by the DU; the first entity being the DU, the second entity being the CU-CP, and the UE specific connection assistance information being included in an uplink RRC message transfer message transmitted to the CU-CP by the DU; the first entity being the CU-UP, and the second entity being the CU-CP, and the UE specific connection assistance information being included in an bearer context setup response message transmitted to the CU-CP by the CU-UP; the first entity being the base station, and the second entity being the other base station different from the base station, and the UE specific connection assistance information being included in a secondary node addition request acknowledge message transmitted to the other base station by the base station; the first entity being the base station, the second entity being another base station different from the base station, and the UE specific connection assistance information being included in a secondary node modification required message transmitted to the other base station by the base station; the first entity being the base station, and the second entity being the AMF, and the UE specific connection assistance information being included in a connection modification indication message transmitted to the AMF by the base station; the first entity being the base station, the second entity being the AMF, and the UE specific connection assistance information being included in a PDU session resource modify indication message transmitted to the AMF by the base station; the first entity being the base station, the second entity being the AMF, and the UE specific connection assistance information being included in an initial UE message transmitted to the AMF by the base station; the first entity being the base station, the second entity being the AMF, and the UE specific connection assistance information being included in an initial context setup response message transmitted to the AMF by the base station; the first entity being the base station, the second entity being the AMF, and the UE specific connection assistance information being included in an uplink NAS transport message transmitted to the AMF by the base station; the first entity being the base station, the second entity being the AMF, and the UE specific connection assistance information being included in an PDU session resource setup response message transmitted to the AMF by the base station; the first entity being the base station, the second entity being the AMF, and the UE specific connection assistance information being included in a path switch request message transmitted to the AMF by the base station; the first entity being the base station, the second entity being the AMF, and the UE specific connection assistance information being included in a handover request acknowledge message transmitted to the AMF by the base station; the first entity being the base station, and the second entity being the AMF, and the UE specific connection assistance information being included in an PDU session resource modify indication message transmitted to the AMF by the base station; the first entity being the AMF, the second entity being an SMF, and the UE specific connection assistance information being included in an create session management context request message transmitted to the SMF by the AMF; the first entity being the AMF, the second entity being the SMF, and the UE specific connection assistance information being included in an update session management context request message transmitted to the SMF by the AMF; the first entity being the AMF, the second entity being the base station, and the UE specific connection assistance information being included in a handover request message transmitted to the base station by the AMF; the first entity being the AMF and the second entity being the PCF.

Optionally, the first entity transmits the connection assistance information based on a connection assistance information request from the second entity, or the first entity transmits the connection assistance information based on configuration of the first entity, and wherein the connection assistance information request comprises at least one of the followings: connection assistance information request indication, access network connection assistance information request indication, transport network connection assistance information request indication, and wherein each of the connection assistance information request indication, the access network connection assistance information request indication, and the transport network connection assistance information request indication comprises at least one of a control plane connection assistance information indication and a user plane connection assistance information indication.

Optionally, the first entity, the second entity, and the connection assistance information request from the second entity are configured as one of the followings: the first entity being the DU, the second entity being the CU, the connection assistance information request from the second entity being included in a UE context setup request message transmitted to the DU by the CU; the first entity being the CU-UP, the second entity being the CU-CP, and the connection assistance information request from the second entity being included in a GNB-CU-CP E1 setup request transmitted to the CU-UP by the CU-CP; the first entity being the CU-UP, the second entity being the CU-CP, and the connection assistance information request from the second entity being included in an bearer context setup request message transmitted by the CU-CP to the CU-UP; the first entity being a base station, and the second entity being the other base station different from the base station, and the connection assistance information request from the second entity being included in an Xn setup request message transmitted to the base station by the other base station; the first entity being the base station, the second entity being the other base station different from the base station, and the connection assistance information request from the second entity being included in a secondary node addition request message transmitted to the base station by the other base station; the first entity being the base station, the second entity being the AMF, and the connection assistance information request from the second entity being included in an PDU session resource setup request message transmitted to the base station by the AMF; the first entity being the base station, the second entity being the AMF, and the connection assistance information request from the second entity being included in an initial context setup request message transmitted to the base station by the AMF; the first entity being the base station and the second entity being the AMF, and the connection assistance information request from the second entity being included in a handover request message transmitted by the AMF to the base station.

Optionally, the connection assistance information is one of one or more user plane transport network layer connection information and a user plane transport network layer connection indication.

Optionally, the first entity, the second entity, and the one or more user plane transport network layer connection information are configured as one of the followings: the first entity being the CU-UP, the second entity being the CU-CP, and the one or more user plane transport network layer connection information being included in a GNB-CU-UP E1 setup request message transmitted to the CU-CP by the CU-UP; the first entity being the CU-UP, the second entity being the CU-CP, and the one or more user plane transport network layer connection information being included in a GNB-CU-UP configuration update message transmitted to the CU-CP by the CU-UP; the first entity being the CU-UP, the second entity being the CU-CP, and the one or more user plane transport network layer connection information being included in a GNB-CU-CP E1 setup response message transmitted to the CU-CP by the CU-UP; the first entity being the base station, the second entity being the AMF, and the one or more user plane transport network layer connection information being included in a RAN configuration update message transmitted to the AMF by the base station; the first entity being the base station, the second entity being the AMF, and the one or more user plane transport network layer connection information being included in an NG setup request message transmitted to the AMF by the base station; the first entity being the base station, the second entity being the AMF, and the one or more user plane transport network layer connection information being included in an initial UE message transmitted to the AMF by the base station; the first entity being the base station, the second entity being the AMF, and the one or more user plane transport network layer connection information being included in an uplink NAS transport message transmitted by the base station to the AMF; the first entity being the AMF and the second entity being the SMF, and the one or more user plane transport network layer connection information being included in an create session management context request message transmitted by the AMF to the SMF; the first entity being the AMF and the second entity being the SMF, and the one or more user plane transport network layer connection information being included in an update session management context request message transmitted by the AMF to the SMF.

Optionally, the first entity, the second entity, and the user plane transport network layer connection indication are configured as one of the followings: the first entity being the SMF, the second entity being the AMF, and the user plane transport network layer connection indication being included in an create session management context response message transmitted by the SMF to the AMF; the first entity being the SMF, the second entity being the AMF, and the user plane transport network being included in an update session management context response message transmitted by the SMF to the AMF; the first entity being the AMF, the second entity being the base station, and the user plane transport network layer connection indication being included in an PDU session resource setup request message transmitted to the base station by the AMF; the first entity being the AMF, the second entity being the base station, and the user plane transport network layer connection indication being included in an PDU session resource modify request message transmitted to the base station by the AMF; the first entity being the AMF, the second entity being the base station, and the user plane transport network layer connection indication being included in a handover request message transmitted to the base station by the AMF; the first entity being the CU-CP and the second entity being the CU-UP, and the user plane transport network layer connection indication being included in an bearer context setup request message transmitted by the CU-CP to the CU-UP; the first entity being the CU-CP and the second entity being the CU-UP, and the user plane transport network layer connection indication being included in an bearer context modification request message transmitted by the CU-CP to the CU-UP.

Optionally, the first entity transmits the connection assistance information based on the connection assistance information request indication from the second entity, or the first entity transmits the connection assistance information based on the configuration of the first entity, and wherein the connection assist information request indication comprises at least one of a request indication, a request network type, a request delay indication and a request bandwidth indication.

According to another aspect of the present disclosure, a method that being performed by a second entity in the wireless communication system is provided, which comprises receiving connection assistance information from the first entity in the wireless communication system.

Optionally, the connection assistance information comprises at least one of the followings: a connection ID, a network type and a delay indication, a bandwidth indication and a connection indication.

Optionally, the connection assistance information is common connection assistance information, and wherein the common connection assistance information comprises at least one of the access network connection assistance information of all cells under the first entity and the transport network connection assistance information of all nodes under the first entity, and wherein the access network connection assistance information of all cells under the first entity comprises at least one of the control plane connection assistance information of the access network and the user plane connection assistance information of the access network, and wherein the transport network connection assistance information of all nodes under the first entity comprises at least one of the control plane connection assistance information of the transport network and the user plane connection assistance information of the transport network.

Optionally, the first entity, the second entity, and the common connection assistance information are configured as one of the followings: the first entity being a distribution unit DU, the second entity being a central control unit CU, and the common connection assistance information being included in an F1 interface setup message transmitted to the CU by the DU; the first entity being the DU and the second entity being the CU, and the common connection assistance information being included in a GNB-DU configuration update message transmitted to the CU by the DU; the first entity being the DU, the second entity being a central control unit-control plane CU-CP, and the common connection assistance information being included in an F1 interface setup message transmitted to the CU-CP by the DU; the first entity being the DU, the second entity being the CU-CP, and the common connection assistance information being included in a GNB-DU configuration update message transmitted to the CU-CP by the DU; the first entity being central control unit-user plane CU-UP, and the second entity being the CU-CP, and the common connection assistance information being included in GNB-CU-UP E1 setup request message transmitted to the CU-CP by the CU-UP; the first entity being the CU-UP, the second entity being the CU-CP, and the common connection assistance information being included in a GNB-CU-CP configuration update message transmitted to the CU-CP by the CU-UP; the first entity being the CU-UP, the second entity being the CU-CP, and the common connection assistance information being included in a GNB-CU-CP E1 setup response message transmitted to the CU-CP by the CU-UP; the first entity being a base station, the second being another base station different from the base station, and the common connection assistance information being included in an Xn setup request message transmitted by the base station to the other base station; the first entity being a base station, and the second entity being another base station different from the base station, and the common connection assistance information being included in an Xn setup response message transmitted to the other base station by the base station; the first entity being a base station, and the second entity being another base station different from the base station, and the common connection assistance information being included in a next generation-wireless access network NG-RAN configuration update message transmitted to the other base station by the base station; the first entity being the base station, the second entity being the access control and mobility management function entity AMF, and the common connection assistance information being included in a RAN configuration update message transmitted by the base station to the AMF; the first entity being the base station and the second entity being the AMF, and the common connection assistance information being included in an NG setup request message transmitted to the AMF by the base station.

Optionally, the connection assistance information is UE specific connection assistance information, wherein the UE specific connection assistance information comprises at least one of the followings: UE specific access network connection assistance information and UE specific transport network connection assistance information, and wherein, the UE specific access network connection assistance information comprises at least one of the control plane connection assistance information of the access network and the user plane connection assistance information of the access network, and wherein the UE specific transport network connection assistance information comprises at least one of the control plane connection assistance information of the transport network and the user plane connection assistance information of the transport network.

Optionally, the first entity, the second entity, and the UE specific connection assistance information are configured as one of the followings: the first entity being the DU, the second entity being the CU, and the UE specific connection assistance information being included in an uplink RRC message transfer message transmitted to the CU by the DU; the first entity being the DU, the second entity being the CU, and the UE specific connection assistance information being included in an UE context setup response message transmitted to the CU by the DU; the first entity being the DU, the second entity being the CU-CP, and the UE specific connection assistance information being included in an uplink RRC message transfer message transmitted to the CU-CP by the DU; the first entity being the CU-UP, and the second entity being the CU-CP, and the UE specific connection assistance information being included in an bearer context setup response message transmitted to the CU-CP by the CU-UP; the first entity being the base station, and the second entity being another base station different from the base station, and the UE specific connection assistance information being included in a secondary node addition request acknowledge message transmitted to the other base station by the base station; the first entity being the base station, the second entity being another base station different from the base station, and the UE specific connection assistance information being included in a secondary node modification request message transmitted to the other base station by the base station; the first entity being the base station, and the second entity being the AMF, and the UE specific connection assistance information being included in an connection modification indication message transmitted to the AMF by the base station; the first entity being the base station, the second entity being the AMF, and the UE specific connection assistance information being included in an PDU session resource modify indication message transmitted to the AMF by the base station; the first entity being the base station, the second entity being the AMF, and the UE specific connection assistance information being included in an initial UE message transmitted to the AMF by the base station; the first entity being the base station, the second entity being the AMF, and the UE specific connection assistance information being included in an initial context setup response message transmitted to the AMF by the base station; the first entity being the base station, the second entity being the AMF, and the UE specific connection assistance information being included in an uplink NAS transport message transmitted by the base station to the AMF; the first entity being the base station, the second entity being the AMF, and the UE specific connection assistance information being included in an PDU session resource setup response message transmitted by the base station to the AMF; the first entity being the base station, the second entity being the AMF, and the UE specific connection assistance information being included in a path switch request message transmitted to the AMF by the base station; the first entity being the base station, the second entity being the AMF, and the UE specific connection assistance information being included in a handover request acknowledge message transmitted by the base station to the AMF; the first entity being the base station, and the second entity being the AMF, and the UE specific connection assistance information being included in an PDU session resource modify indication message transmitted to the AMF by the base station; the first entity being the AMF, the second entity being the SMF, and the UE specific connection assistance information being included in a create session management context request message transmitted by the AMF to the SMF; the first entity being the AMF, the second entity being the SMF, and the UE specific connection assistance information being included in an update session management context request message transmitted by the AMF to the SMF; the first entity being the AMF, the second entity being the base station, and the UE specific connection assistance information being included in a handover request message transmitted to the base station by the AMF; the first entity being the AMF and the second entity being a PCF.

Optionally, the first entity transmits the connection assistance information based on a connection assistance information request from the second entity, or the first entity transmits the connection assistance information based on the configuration of the first entity. Where, the connection assistance information request comprises at least one of the followings: connection assistance information request indication, access network connection assistance information request indication, transport network connection assistance information request indication, and wherein each of the connection assistance information request indication, the access network connection assistance information request indication, and transport network connection assistance information request indication comprises at least one of the control plane connection assistance information indication and the user plane connection assistance information indication.

Optionally, the first entity, the second entity, and the connection assistance information request from the second entity are configured as one of the followings: the first entity being the DU, the second entity being the CU, the connection assistance information request from the second entity being included in an UE context setup request message transmitted to the DU by the CU; the first entity being the CU-UP, the second entity being the CU-CP, and the connection assistance letter from the second entity being included in a GNB-CU-CP E1 setup request transmitted by the CU-CP to the CU-UP; the first entity being the CU-UP, the second entity being the CU-CP, and the connection assistance information request from the second entity being included in an bearer context setup request message transmitted by the CU-CP to the CU-UP; the first entity being a base station, and the second entity being another base station different from the base station, and the connection assistance information request from the second entity being included in an Xn setup request message transmitted to the base station by the other base station; the first entity being the base station, the second entity being another base station different from the base station, and the connection assistance information request from the second entity being included in a secondary node addition request message transmitted to the base station by the other base station; the first entity being the base station, the second entity being the AMF, and the connection assistance information request from the second entity being included in an PDU session resource setup request message transmitted to the base station by the AMF; the first entity being the base station, the second entity being the AMF, and the connection assistance information request from the second entity being included in an initial context setup request message transmitted to the base station by the AMF; the first entity being the base station and the second entity being the AMF, and the connection assistance information request from the second entity being included in a handover request message transmitted by the AMF to the base station.

Optionally, the connection assistance information is one of one or more user plane transport network layer connection information and a user plane transport network layer connection indication.

Optionally, the first entity, the second entity, and the one or more user plane transport network layer connection information are configured as one of the followings: the first entity being the CU-UP, the second entity being the CU-CP, and the one or more user plane transport network layer connection information being included in a GNB-CU-UP E1 setup request message transmitted to the CU-CP by the CU-UP; the first entity being the CU-UP, the second entity being the CU-CP, and the one or more user plane transport network layer connection information being included in a GNB-CU-UP configuration update message transmitted to the CU-CP by the CU-UP; the first entity being the CU-UP, the second entity being the CU-CP, and the one or more user plane transport network layer connection information being included in a GNB-CU-CP E1 setup response message transmitted to the CU-CP by the CU-UP; the first entity being the base station, the second entity being the AMF, and the one or more user plane transport network layer connection information being included in a RAN configuration update message transmitted to the AMF by the base station; the first entity being the base station, the second entity being the AMF, and the one or more user plane transport network layer connection information being included in an NG setup request message transmitted to the AMF by the base station; the first entity being the base station, the second entity being the AMF, and the one or more user plane transport network layer connection information being included in an initial UE message transmitted to the AMF by the base station; the first entity being the base station, the second entity being the AMF, and the one or more user plane transport network layer connection information being included in an uplink NAS transport message transmitted by the base station to the AMF; the first entity being the AMF and the second entity being the SMF, and the one or more user plane transport network layer connection information being included in a create session management context request message transmitted by the AMF to the SMF; the first entity being the AMF and the second entity being the SMF, and the one or more user plane transport network layer connection information being included in an update session management context request message transmitted by the AMF to the SMF.

Optionally, the first entity, the second entity, and the user plane transport network layer connection indication are configured as one of the followings: the first entity being the SMF, the second entity being the AMF, and the user plane transport network layer connection indication being included in an create session management context response message transmitted by the SMF to the AMF; the first entity being the SMF, the second entity being the AMF, and the user plane transport network being included in an update session management context response message transmitted by the SMF to the AMF; the first entity being the AMF, the second entity being the base station, and the user plane transport network layer connection indication being included in an PDU session resource setup request message transmitted to the base station by the AMF; the first entity being the AMF, the second entity being the base station, and the user plane transport network layer connection indication being included in a PDU session resource modify request message transmitted to the base station by the AMF; the first entity being the AMF, the second entity being the base station, and the user plane transport network layer connection indication being included in a handover request message transmitted to the base station by the AMF; the first entity being the CU-CP and the second entity being the CU-UP, and the user plane transport network layer connection indication being included in a bearer context setup request message transmitted by the CU-CP to the CU-UP; the first entity being the CU-CP and the second entity being the CU-UP, and the user plane transport network layer connection indication being included in a bearer context modification request message transmitted by the CU-CP to the CU-UP.

Optionally, the first entity transmits the connection assistance information based on the connection assistance information request indication from the second entity, or the first entity transmits the connection assistance information based on the configuration of the first entity, and wherein the connection assist information request indication comprises at least one of a request indication, a request network type, a request delay indication and a request bandwidth indication.

According to yet another aspect of the present disclosure, an apparatus in a wireless communication network is provided, including: a transceiver, configured to transmit and receive signals; and a controller, configured to control the transceiver to transmit connection assistance information to another entity in the wireless communication system.

According to yet another aspect of the present disclosure, an apparatus in a wireless communication network is provided, including: a transceiver, configured to transmit and receive signals; and a controller, configured to control the transceiver to receive connection assistance information from another entity in the wireless communication system.

Various embodiments of the present disclosure may be realized as computer readable code embodied on a computer-readable recording medium from a specific perspective. The computer-readable recording medium can be a volatile computer-readable recording medium or a non-volatile computer-readable recording medium. Computer readable recording medium is any data storage device that can store the data readable by computer system. Examples of a computer-readable recording medium may include read-only memory (ROM), random access memory (RAM), Compact Disc Read-Only Memory (CD-ROM), tape, floppy disk, optical data storage device, carrier (e.g., data transmission via the Internet), and so on. The computer-readable recording medium can be distributed through a computer system connected via the network, and thus computer-readable code can be stored and executed in a distributed manner. Moreover, the functional procedures, codes and code segments for implementing various embodiments of the present disclosure may be easily explained by those skilled in the art in which embodiments of the present disclosure are applied.

It will be understood that embodiments of the present disclosure can be implemented in the form of hardware, software or a combination of hardware and software. The software can be stored as program instructions or computer readable codes executable on a processor on a non-transient computer-readable medium. Examples of non-transient computer-readable recording media include magnetic storage media (e.g., ROM, floppy disk, hard disk, etc.) and optical recording media (e.g., CD-ROM, digital video disk (DVD), etc.). The non-transient computer-readable recording medium can also be distributed on the computer system coupled by the network, which makes the computer-readable code stored and executed in a distributed way. The medium can be read by the computer, stored in memory, and executed by the processor. Various embodiments may be implemented by a computer or a portable terminal including a controller and a memory, and the memory may be an example of a non-transient computer-readable recording medium suitable for storing program(s) having instructions to implement embodiments of the present disclosure. The present disclosure may be realized by a program having codes for embodying the apparatus and method described in the claim, which is stored in a machine (or computer) readable storage medium. The program may be carried electronically on any medium, such as a communication signal transmitted via a wired or wireless connection, and the present disclosure appropriately comprises its equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first entity in a wireless communication system, the method comprising:

receiving, from a second entity, a first message for requesting management of a session related to a non-terrestrial network (NTN), the first message including user plane transport network layer connection information for the session supported by a base station;

identifying a user plane transport network layer connection for the session, by combining the user plane transport network layer connection information received in the first message and criteria for user plane function (UPF) selection; and transmitting, to the second entity, a second message in response to the first message, the second message including information indicating the identified user plane transport network layer connection, wherein the user plane transport network layer connection information includes delay information indicating a one-way theoretical delay of data on the session and bandwidth information indicating a bandwidth that is supported for the session, and wherein the information indicating the identified user plane transport network layer connection is associated with a port internet protocol (IP) address and a port number for the session to be assigned by the base station.

2. The method of claim 1, wherein the first message further includes of network type information indicating a network type of the NTN corresponding to the session.

3. The method of claim 1, wherein the information indicating the identified user plane transport network layer connection includes a connection identifier (ID), an endpoint IP address, or a tunnel endpoint identifier (TEID).

4. The method of claim 1, wherein
the criteria for UPF selection include at least one of a UPF load or a user equipment (UE) location.

5. The method of claim 1, wherein in case that the session includes a ground gateway, the delay information is associated with a position of the ground gateway.

6. A method performed by a second entity in a wireless communication system, the method comprising:

transmitting, to a first entity, a first message for requesting management of a session related to a non-terrestrial network (NTN), the first message including user plane transport network layer connection information for the session supported by a base station; and receiving, from the first entity, a second message in response to the first message, the second message including information indicating a user plane transport network layer connection for the session, wherein the user plane transport network layer connection information is combined with criteria for user plane function (UPF) selection for identifying the user plane transport network layer connection, wherein the user plane transport network layer connection information includes delay information indicating a one-way theoretical delay of data on the session and bandwidth information indicating a bandwidth that is supported for the session, and wherein the information indicating the identified user plane transport network layer connection is associated with a port internet protocol (IP) address and a port number for the session to be assigned by the base station.

7. The method of claim 6, wherein the first message further includes network type information indicating a network type of the NTN corresponding to the session.

8. The method of claim 6, wherein the information indicating the identified user plane transport network layer connection includes a connection identifier (ID), an endpoint IP address, or a tunnel endpoint identifier (TEID).

9. The method of claim 6, wherein the criteria for UPF selection include at least one of a UPF load or a user equipment (UE) location.

10. The method of claim 6, wherein in case that the session includes a ground gateway, the delay information is associated with a position of the ground gateway.

11. A first entity in a wireless communication system, the first entity comprising:
  a transceiver; and
  a controller configured to:
    receive, from a second entity via the transceiver, a first message for requesting management of a session related to a non-terrestrial network (NTN), the first message including user plane transport network layer connection information for the session supported by a base station,
    identify a user plane transport network layer connection for the session, by combining the user plane transport network layer connection information received in the first message and criteria for user plane function (UPF) selection, and
    transmit, to the second entity via the transceiver, a second message in response to the first message, the second message including information indicating the identified user plane transport network layer connection,
  wherein the user plane transport network layer connection information includes delay information indicating a one-way theoretical delay of data on the session and bandwidth information indicating a bandwidth that is supported for the session, and
  wherein the information indicating the identified user plane transport network layer connection is associated with a port internet protocol (IP) address and a port number for the session to be assigned by the base station.

12. The first entity of claim 11, wherein the first message further includes of network type information indicating a network type of the NTN corresponding to the session.

13. The first entity of claim 11, wherein the information indicating the identified user plane transport network layer connection includes a connection identifier (ID), an endpoint IP address, or a tunnel endpoint identifier (TEID).

14. The first entity of claim 11, wherein
  the criteria for UPF selection include at least one of a UPF load or a user equipment (UE) location.

15. The first entity of claim 11, wherein in case that the session includes a ground gateway, the delay information is associated with a position of the ground gateway.

16. A second entity in a wireless communication system, the second entity comprising:
  a transceiver; and
  a controller configured to:
    transmit, to a first entity via the transceiver, a first message for requesting management of a session related to a non-terrestrial network (NTN), the first message including user plane transport network layer connection information for the session supported by a base station, and
    receive, from the first entity via the transceiver, a second message in response to the first message, the second message including information indicating a user plane transport network layer connection for the session,
  wherein the user plane transport network layer connection information is combined with criteria for user plane function (UPF) selection for identifying the user plane transport network layer connection,
  wherein the user plane transport network layer connection information includes delay information indicating a one-way theoretical delay of data on the session and bandwidth information indicating a bandwidth that is supported for the session, and
  wherein the information indicating the identified user plane transport network layer connection is associated with a port internet protocol (IP) address and a port number for the session to be assigned by the base station.

17. The second entity of claim 16, wherein the first message further includes network type information indicating a network type of the NTN corresponding to the session.

18. The second entity of claim 16, wherein the information indicating the identified user plane transport network layer connection includes a connection identifier (ID), an endpoint IP address, or a tunnel endpoint identifier (TEID).

19. The second entity of claim 16, wherein the criteria for UPF selection include at least one of a UPF load or a user equipment (UE) location.

20. The second entity of claim 16, wherein in case that the session includes a ground gateway, the delay information is associated with a position of the ground gateway.

* * * * *